United States Patent
Liu et al.

(10) Patent No.: US 8,400,140 B2
(45) Date of Patent: Mar. 19, 2013

(54) SENSITIVITY SENSOR SYSTEM

(75) Inventors: Cheng-Wei Liu, Hsinchu (TW); Chao-Yu Lin, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 300 days.

(21) Appl. No.: 12/817,618

(22) Filed: Jun. 17, 2010

(65) Prior Publication Data
US 2011/0309822 A1 Dec. 22, 2011

(30) Foreign Application Priority Data
Feb. 24, 2010 (CN) .......................... 2010 1 0120492

(51) Int. Cl.
*G01R 19/00* (2006.01)
(52) U.S. Cl. ................................................. 324/123 R
(58) Field of Classification Search .............. 324/123 R, 324/762.01–762.1, 764.01; 257/48; 438/14–18
See application file for complete search history.

(56) References Cited

U.S. PATENT DOCUMENTS

| 6,525,531 B2 * | 2/2003 | Forrest et al. .............. 324/207.2 |
| 7,307,411 B1 * | 12/2007 | Hsu et al. ................... 324/76.13 |

* cited by examiner

*Primary Examiner* — Tung X Nguyen
(74) *Attorney, Agent, or Firm* — Rosenberg, Klein & Lee

(57) ABSTRACT

A sensor system for receiving an input signal and applying a digital control signal to adjust an output sensitivity of a triggering signal within the sensor system. The input signal includes a bias DC and a fluctuation bias voltage. The sensor system includes a first voltage contact, a normalized voltage contact, a normalized circuit and a comparison circuit. The first voltage contact provides a first comparison voltage based on the digital control signal, wherein the first comparison voltage defines a standby voltage region. The normalized voltage contact provides a reference voltage based on the digital control signal, wherein the reference voltage is located within the standby voltage region. When the fluctuation bias voltage is located outside of the standby voltage region, the sensor system outputs a triggering signal so as to adjust the digital control signal.

20 Claims, 24 Drawing Sheets

SENSITIVITY SENSOR SYSTEM

BACKGROUND OF THE INVENTION

1. Field of the Invention

The present invention relates to a sensor system, more particularly to an sensor system that is to be applied in a sensor device in order to adjust the sensitivity of the sensor device.

2. Description of the Prior Art

In the prior art technology, the sensitivity of a sensor system is usually adjusted through the magnitude of an operation amplifier so as to change the sensitivity of the sensor system. Therefore, by adjusting a variable resistor and change the magnitude of the operation amplifier, thereby achieving the sensitivity of the sensor system.

Referring to FIG. 1, a circuit diagram of the prior sensor system 1 is shown to include a voltage supply VCC coupled electrically to a resistor R1, a voltage contact P1, a resistor R2, a voltage contact P2, a resistor R3, a voltage contact P3, a resistor R4 and a GND (ground) contact, wherein, the voltage contacts P1, P2, P3 respectively have a first voltage V1, a second voltage V2 and a third voltage V3.

The operation amplifier 11 has an input end coupled electrically to an input signal source 2, which generates an input signal S1 into the input end of the operation amplifier 11 so as to be amplified thereby.

The operation amplifier 12 has an input end coupled electrically to the voltage contact P2, another input end coupled electrically to the output end of the operation amplifier 11, by a variable resistor VR and based on the second voltage V2 to adjust the magnitude of the operation amplifier 12, thereby adjusting the bias DC and the fluctuation bias voltage of the input signal S1 to generate an adjustment signal S2.

The operation amplifiers 13, 14 and an Or gate 15 are coupled together to form a window-type comparator, wherein an input end of the operation amplifier 13 is coupled electrically to the voltage contact P1, another input end thereof is coupled electrically to the output end of the operation amplifier 12 so that the operation amplifier 13 obtains a first voltage V1 and the fluctuation bias voltage of the adjustment signal S2. The operation amplifier 14 has an input end coupled electrically to the voltage contact P3, another input end thereof is coupled electrically to the output end of the operation amplifier 12 so that the operation amplifier 14 obtains a third voltage V3 and the fluctuation bias voltage of the adjustment signal S2. In addition, one input end of the Or gate 15 is coupled electrically to the output end of the operation amplifier 13, another input end thereof is coupled electrically to the output end of the operation amplifier 14 so as to determine whether the fluctuation bias voltage of the adjustment signal S2 is located within a standby voltage region defined cooperatively by the first and third voltages V1 and V3.

When the fluctuation bias voltage of the adjustment signal S2 is located outside of the standby voltage region defined cooperatively by the first and third voltages V1 and V3, the sensor system 1 generates a triggering signal S3.

FIG. 2A shows a voltage-time graph of the adjustment signal S2 when the prior art sensor system 1 is at the predetermined sensitivity. Also referring to FIG. 1 and as illustrated, the first, second and third voltages V1, V2 and V3 are 1.2 volts, 1 volts and 0.8 volt respectively. The first and third voltages V1 and V3 cooperatively define a standby voltage region of 0.4 volts. Therefore, as shown in FIG. 2A, the fluctuation bias voltage of the adjustment signal S2 is located three times outside of the standby voltage region defined cooperatively by the first and third voltages V1 and V3. Thus, the triggering signal S3 is generated three times.

FIG. 2B shows a voltage-time graph of the adjustment signal S2 after lowering the sensitivity of the prior art sensor system 1. Also referring to FIG. 1, when it is desired to lower the sensitivity of the sensor system 1, a variable resistor VR is applied to alter the magnitude of the operation amplifier 12 so as to adjust the fluctuation bias voltage of the adjustment signal S2 to be smaller than that shown in FIG. 2A. Therefore, in FIG. 2B, the fluctuation bias voltage of the adjustment signal S2 is located outside of the standby voltage region defined cooperatively by the first and third voltages V1 and V3 only once. Thus, only a single triggering signal S3 is generated.

FIG. 2C shows a voltage-time graph of the adjustment signal S2 after raising the sensitivity of the prior art sensor system 1. Also referring to FIG. 1, when it is desired to raise the sensitivity of the sensor system 1, a variable resistor VR is applied to alter the magnitude of the operation amplifier 12 so as to alter the fluctuation bias voltage of the adjustment signal S2 to be greater than that shown in FIG. 2A. Therefore, in FIG. 2C, the fluctuation bias voltage of the adjustment signal S2 is located outside of the standby voltage region defined cooperatively by the first and third voltages V1 and V3 6 times. Thus, the triggering signal S3 is generated six times.

In the prior art technology, a variable resistor VR is applied to alter the magnitude of the operation amplifier 12, which, in turn, changes the sensitivity of the sensor system 1. However, in using this method, a larger layout area in the printed circuit board is required in the sensor system 1. In addition, because the variable resistor VR itself is a kind of mechanical electronic element, it is susceptible to damage after multiple and repeated operations, thereby increasing the expense for the several numbers of the variable resistors VR.

On this respect, the inventor is indeed necessary to develop a new sensitivity sensor system in order to overcome these problems.

SUMMARY OF THE INVENTION

Therefore, the object of the present invention is to provide a sensor system that is to be applied within a sensor device and that uses a digital control signal to alter the sensitivity of a triggering signal in the sensor system, thereby achieving adjustment of the sensitivity of the sensor device. Since no variable resistor is applied in the sensor system of the present invention, the disadvantages encountered during use of the prior sensor system are avoided.

The sensor system of the present invention is used for receiving an input signal and applying a digital control signal to adjust an output sensitivity of a triggering signal within the sensor system. The input signal includes a bias DC (direct current) and a fluctuation bias voltage. The sensor system accordingly includes a first voltage contact, a normalized voltage contact, a normalized circuit and a comparison circuit.

The first voltage contact provides a first comparison voltage based on the digital control signal, wherein the first comparison voltage defines a standby voltage region. The normalized voltage contact provides a reference voltage based on the digital control signal, wherein the reference voltage is located within the standby voltage region.

The normalized circuit is coupled electrically to the normalized voltage contact for normalizing the bias DC into the reference voltage so as to normally adjusting synchronization of the fluctuation bias voltage with the bias DC. The comparison circuit is coupled electrically to the normalized circuit and the first voltage contact for determining after normalizing the bias DC into the reference voltage whether the fluctuation bias voltage is located within the standby voltage region or not.

When the fluctuation bias voltage is located outside of the standby voltage region, the sensor system outputs the triggering signal so as to adjust the digital control signal, where the first comparison voltage and the reference voltage are simultaneously adjusted, thereby achieving adjustment of the output sensitivity.

A sensitivity adjustment method according to the present invention is applied a sensor system and includes the steps of:

(a) transmitting the digital control signal to a DAC (Digital-to-Analog Converter);

(b) applying the DAC to convert the digital control signal into an analog control signal and transmitting the analog control signal to the first voltage contact and the normalized voltage contact;

(c) generating the first comparison voltage and the reference voltage based on the analog control signal; and (d) adjusting the digital control signal so as to synchronize the first comparison voltage and the reference voltage, thereby achieving the adjustment of the output sensitivity.

In the prior art sensor system, a variable resistor is applied to alter the sensitivity of the sensor device. In contrast, a digital control signal is applied in the sensor system of the present invention to alter the sensitivity of a triggering signal. It is obvious that the layout area within the printed circuit board of the sensor device can be minimized so that no variable resistors are employed, which generally get damage due to repeated functions, thereby saving a tremendous expense for purchase of the variable resistors.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
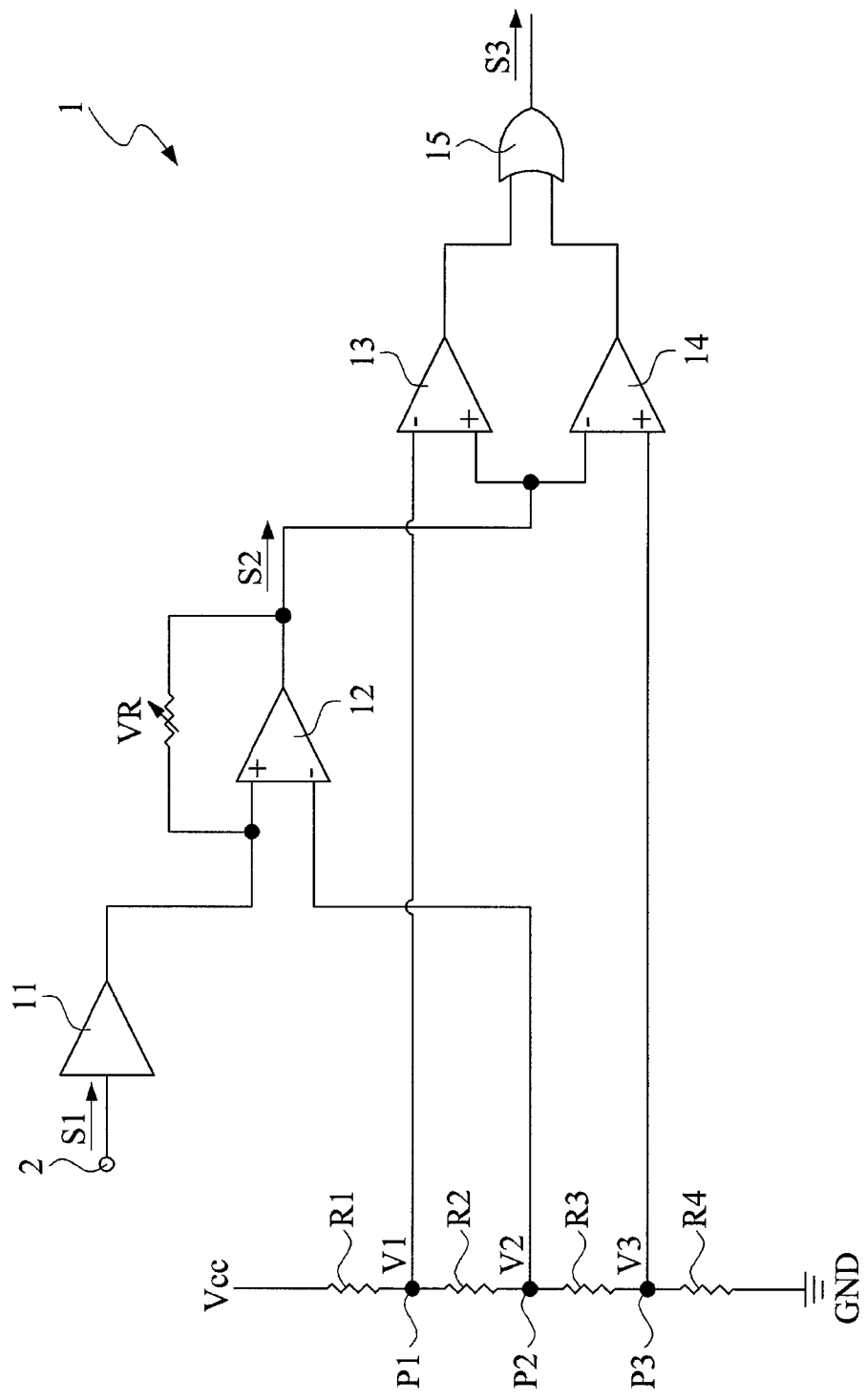
FIG. 1 shows a circuit diagram applied in a prior art sensor system.
Figure 2A:
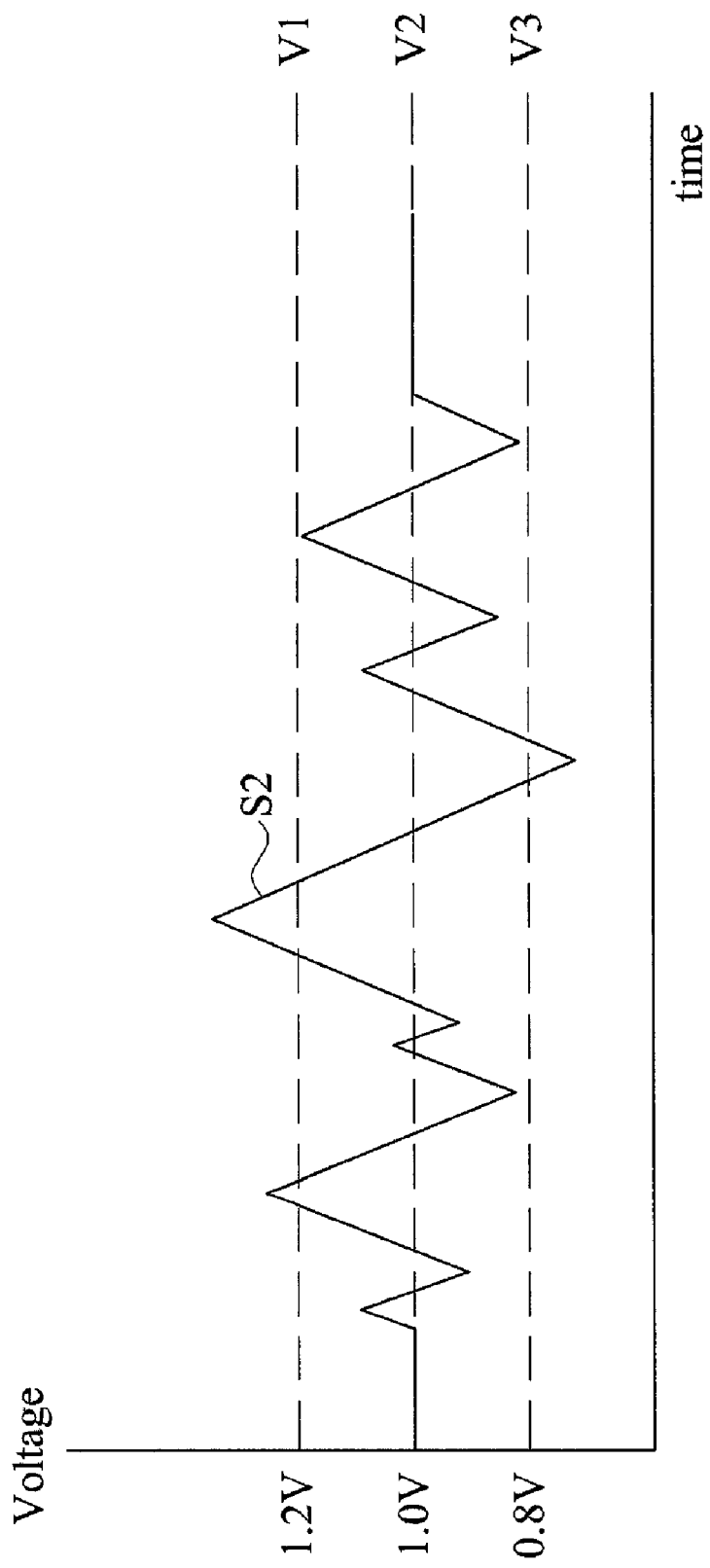
FIG. 2A shows a voltage-time graph when the prior art sensor system is at the predetermined sensitivity.
Figure 2B:
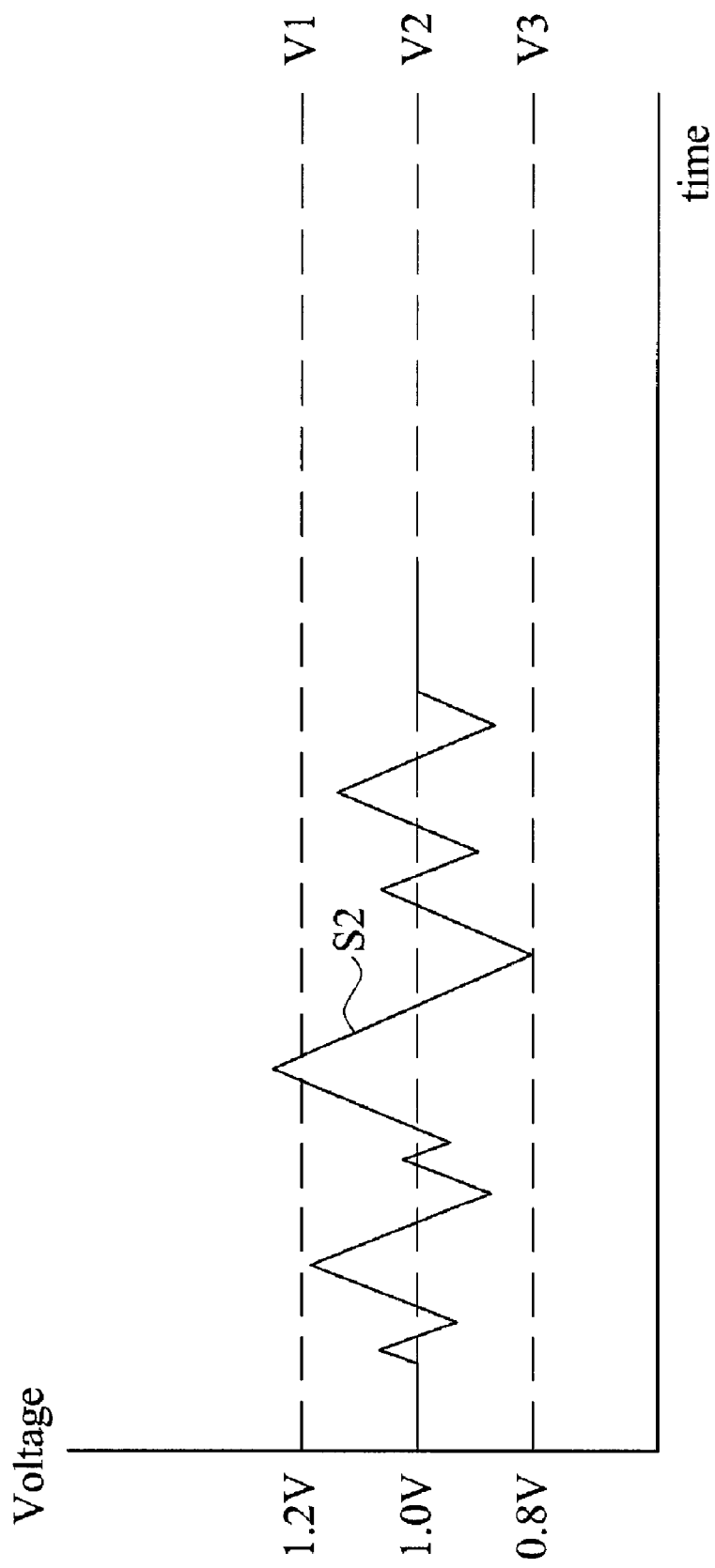
FIG. 2B shows a voltage-time graph after lowering the sensitivity of the prior art sensor system.
Figure 2C:
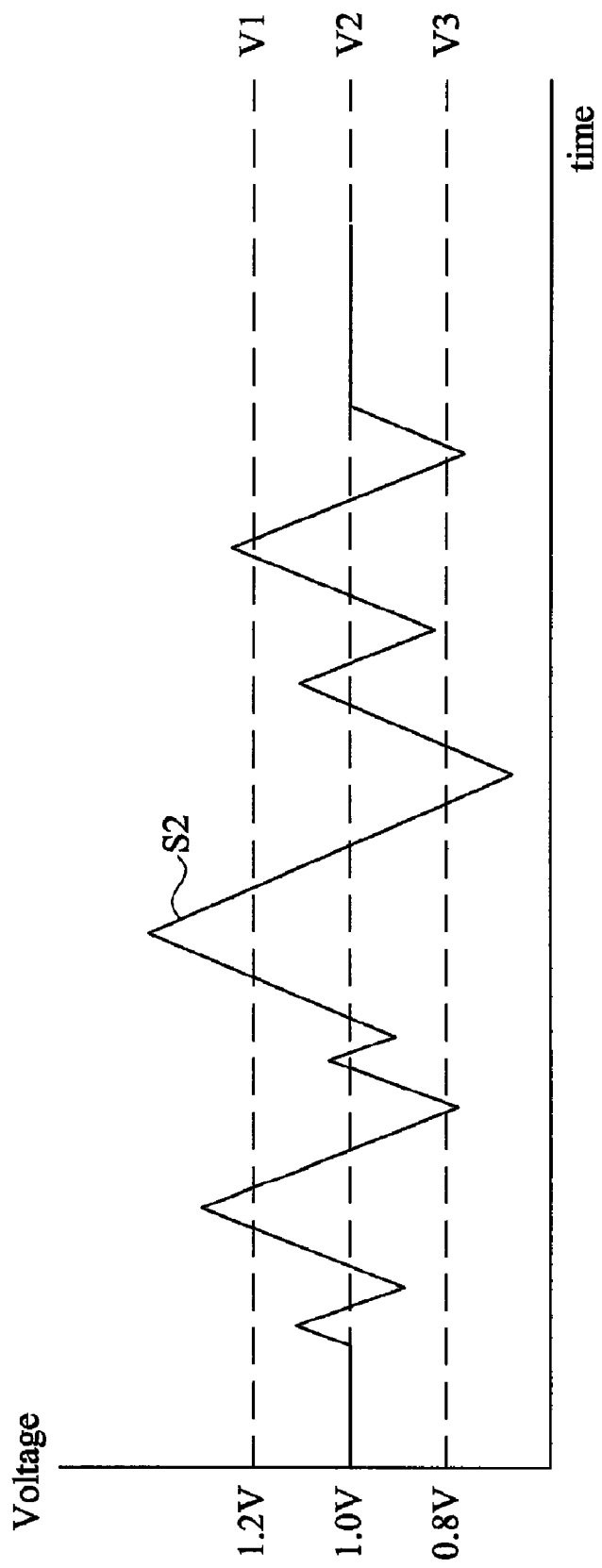
FIG. 2C shows a voltage-time graph after raising the sensitivity of the prior art sensor system.
Figure 3:
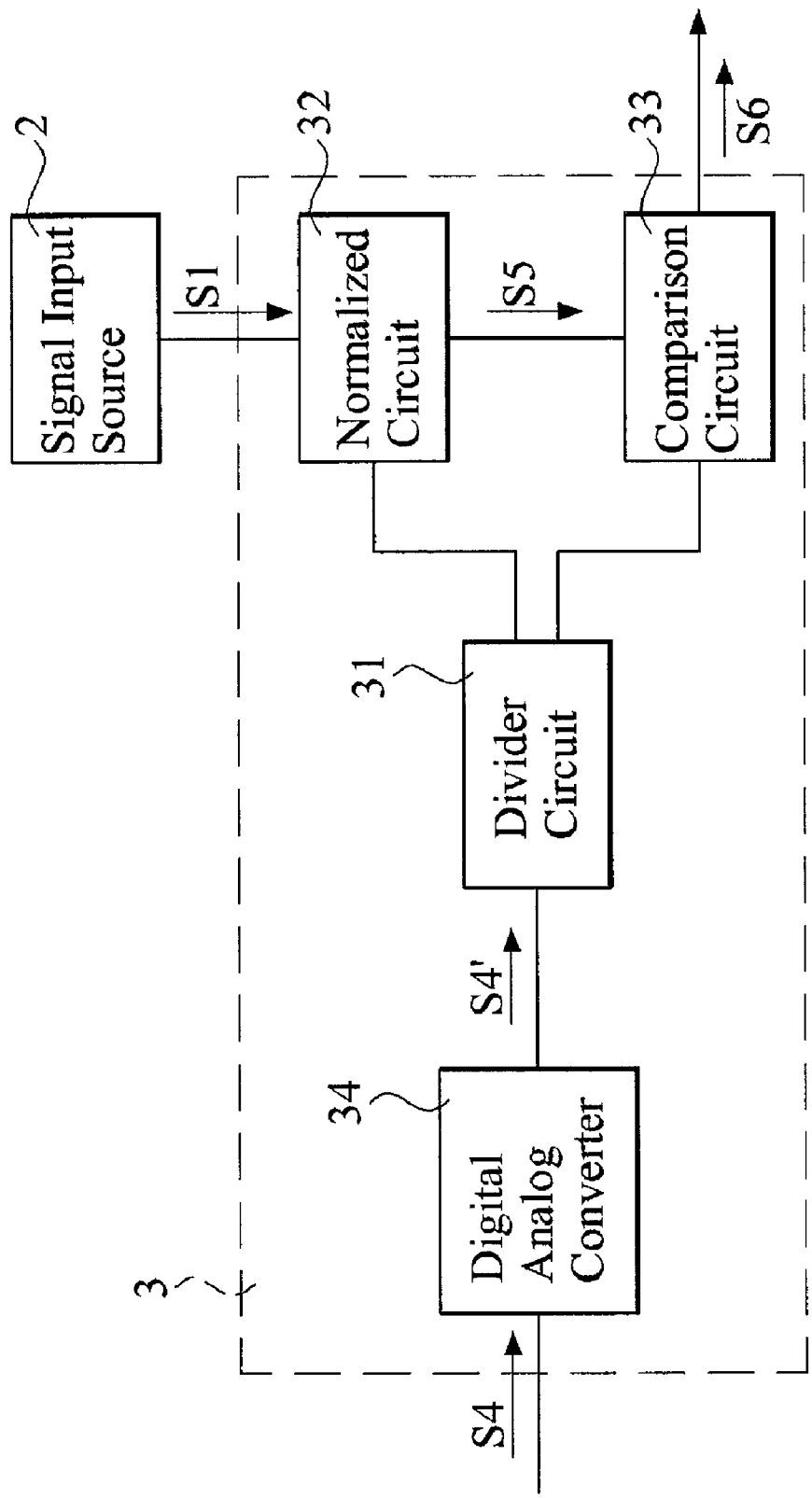
FIG. 3 shows the block diagrams representing the elements in a sensor system of the present invention.
Figure 4:
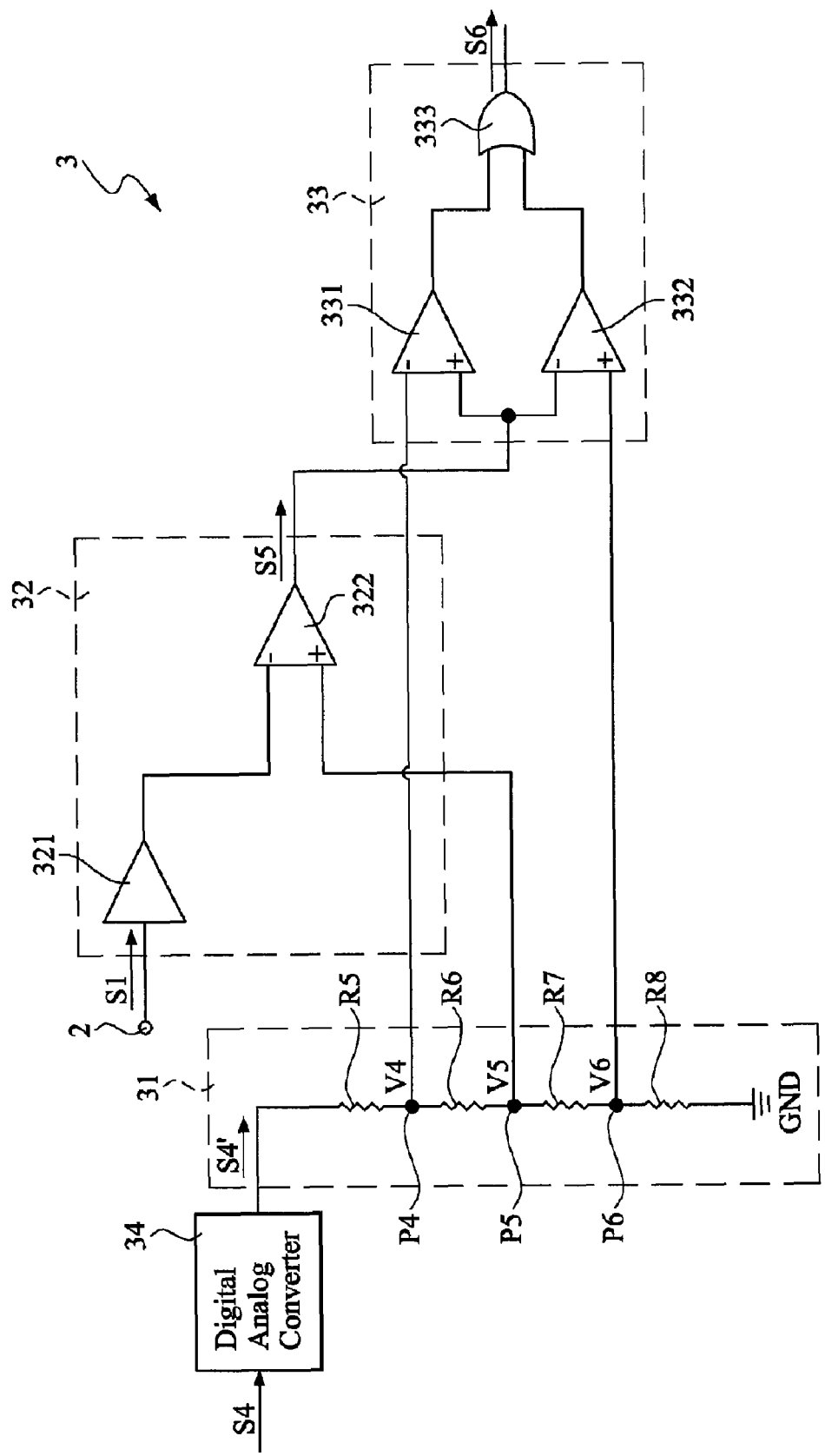
FIG. 4 shows a circuit diagram employed in a first embodiment of the sensor system of the present invention.

Referring to FIGS. 3 and 4, wherein FIG. 3 shows the block diagrams representing the elements in a sensor system of the present invention while FIG. 4 shows a circuit diagram employed in a first embodiment of the sensor system of the present invention. The sensor system 3 accordingly includes a divider circuit 31, a normalized circuit 32, a comparison circuit 33 and a DAC (Digital to Analog Converter) 34, of which, the divider circuit 31 is coupled electrically to the normalized circuit 32, the comparison circuit 33 and the DAC 34 while the normalized circuit 32 is coupled electrically to an input signal source 2, the divider circuit 31 and the comparison circuit 33. The comparison circuit 33 is coupled electrically to the divider circuit 31 and the normalized circuit 32. Preferably, the sensitivity sensor system 3 is an IR sensitivity surveillance system for detecting human body or an infra-red network monitor.

When the input signal source 2 transmits an input signal S1 to the normalized circuit 32, and an electronic device (not shown here) transmits a digital control signal S4 to the DAC 34, the DAC 34 converts the digital control signal S4 into an analog control signals and S4' and later transmits to the divider circuit 32, which divides the same a first comparison voltage V4, a second comparison voltage V6 and a reference voltage V5. The normalized circuit 32 amplifies the input signal S1 based on the reference voltage V5, thereby forming a normalized signal S5, wherein the input signal S1 after being amplified includes a bias DC (direct current) and a fluctuation bias voltage.

The comparison circuit 33 defines a standby voltage region via the first comparison voltage V4 and the second comparison voltage V6. The comparison circuit 33 is capable of determining whether the fluctuation bias voltage of the normalized signal S5 is located within the standby voltage region or not. When the fluctuation bias voltage of the normalized signal S5 is located outside of the standby voltage region, the comparison circuit 33 outputs a triggering signal S6 in order to trigger a working system (not shown here) to perform a predetermined task. For instance, when the sensitivity sensor system 3 is applied to a network video system (such as Internet Protocol Camera; IPCAM), the triggering signal S6 triggers the execution of the predetermined task to work for Bell alerts or startup security and so on.

Referring to FIG. 4, the divider circuit 31 may include four resistors R5, R6, R7, R8. The DAC (digital/analog converter) 34 has an input end coupled electrically to the electronic device in order to make electronic device delivers the digital control signal S4 into the DAC (digital/analog converter) 34, where the digital control signal S4 is converted into the analog control signal S4'. The DAC (digital/analog converter) 34 has an output end coupled electrically to a first end of the resistor R5 while a second end of the resistor R5 is coupled electrically to a first end of the resistor R6, which has a second end coupled electrically to a first end of the resistor R7. The resistor R7 has a second end coupled electrically to a first end of the resistor R8, which has a second end coupled electrically to the ground GND.

Note that, the adjoining point of the resistors R5 and R6 serves as a first voltage contact P4, wherein the analog control signal S4' after passing through the resistor R5 and drops in voltage to form the first comparison voltage V4. The adjoining point of the resistors R6 and R7 serves as a normalized voltage contact P5, wherein the analog control signal S4' after passing through the resistors R6 and R7 and drops in voltage to form the reference voltage V5. The adjoining point of the resistors R7 and R8 serves as a second voltage contact P6, wherein the analog control signal S4' after passing through the resistors R7 and R8 and drops in voltage to form the second comparison voltage V6.

The normalized circuit 32 includes a first operation amplifier 321 and a normalized operation unit 322, of which, the first operation amplifier 321 has one input end coupled electrically to the input signal source 2 in order to accept the input signal S1 from the input signal source 2 and later inputs the same into the first operation amplifier 321 via the input end thereof, thereby amplifying the bias DC and the fluctuation bias voltage of the input signal S1 and outputting through an output end of the first operation amplifier 321.

The normalized operation unit 322 has one input end coupled electrically to the normalized voltage contacts P5, another input end coupled electrically to the output end of the first operation amplifier 321 to normalize the voltage according to the reference voltage V5 and amplify the bias DC of the input signal S1 to form the normalized voltage V5, and normally adjusting synchronization of the fluctuation bias voltage of the input signal S1 with the bias DC, thereby producing the normalized signal S5, which is transmitted via the output of the normalized operation unit 322.

The comparison circuit 33 includes a second operation amplifier 331, a third operation amplifier 332 and a digital logic member 333, of which, the second operation amplifier 331, a third operation amplifier 332 and the digital logic member 333 cooperatively form a window-type comparator. In a first application of one embodiment of the present invention, an Or gate serves as the digital logic member 333.

The second operation amplifier 331 has one input end coupled electrically to the first voltage contact P4, another input end coupled electrically to an output end of the third operation amplifier 332 to enable the second operation amplifier 331 achieve the first comparison voltage V4 and the fluctuation voltage of the normalized signal S5. The third operation amplifier 332 has one input end coupled electrically to the second voltage contact P6, another input end coupled electrically to the output end of the normalized operation unit 322 to enable the third operation amplifier 332 achieve the second comparison voltage V6 and the fluctuation voltage of the normalized signal S5. In addition, the digital logic member 333 has one input end coupled electrically to the output end of the second operation amplifier 331, another input end coupled electrically to the output end of the third operation amplifier 332 so as to determine whether the fluctuation voltage of normalized signal S5 is located within the standby voltage region defined cooperatively by the first and second comparison voltages V4, V6.

When the fluctuation voltage of the normalized signal S5 is located outside of the standby voltage region defined cooperatively by the first and second comparison voltages V4, V6, the sensitivity sensor system 3 outputs the triggering signal S6. When the electronic device is used to adjust the digital control signal S4, the first and second comparison voltages V4 and V6 and the reference voltage V5 are simultaneously adjusted in order the sensitivity sensor system 3 outputs the triggering signal S6.

Figure 5:
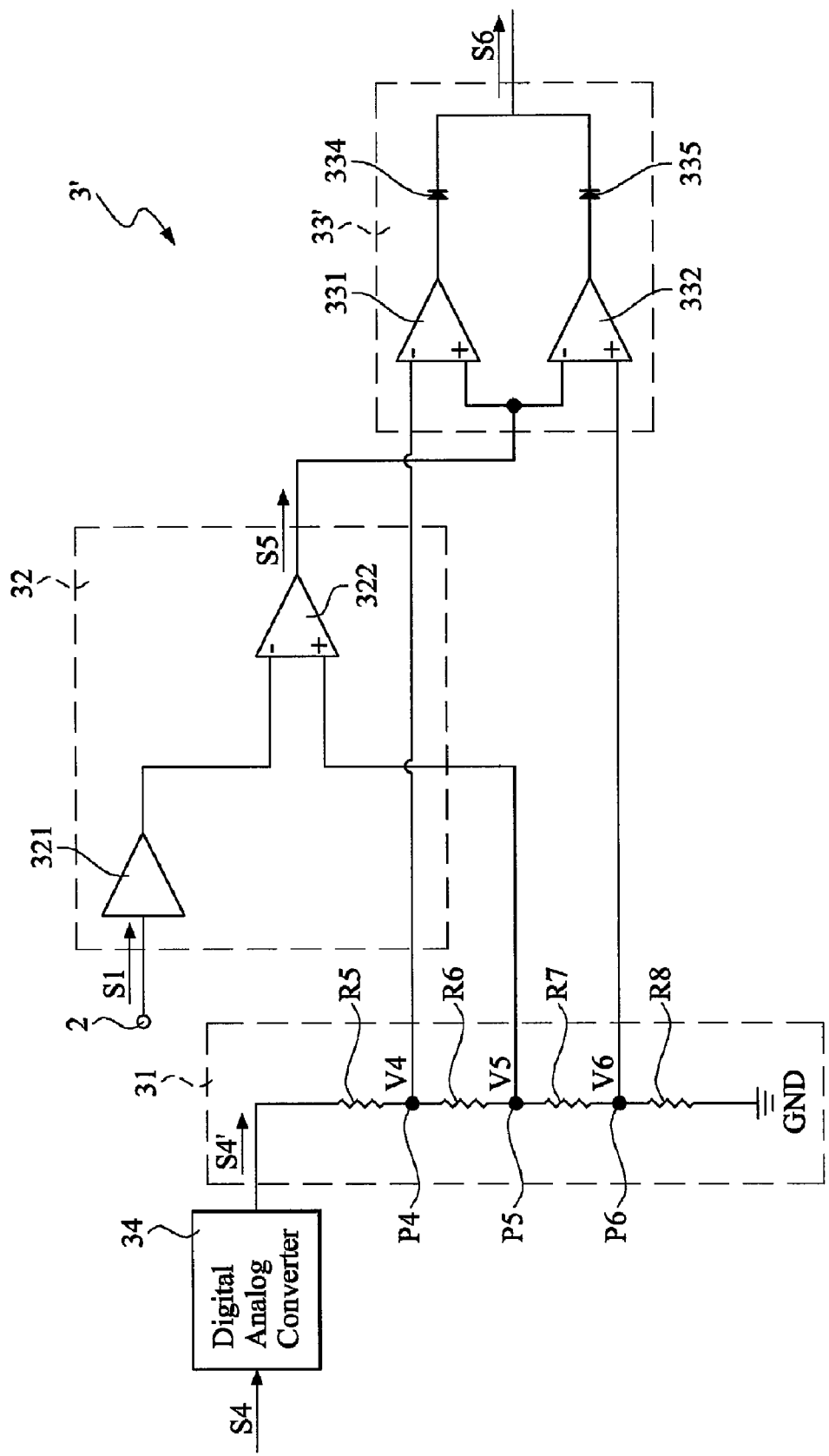
FIG. 5 shows a circuit diagram employed in a second embodiment of the sensor system of the present invention.

FIG. 5 shows a circuit diagram employed in a second embodiment of the sensor system of the present invention. The only difference between the first and second embodiments resides in the comparison circuit 33' of the second embodiment includes the second operation amplifier 331, the third operation amplifier 332, a first judgment diode 334 and a second judgment diode 335. The first judgment diode 334 has one input end coupled electrically to the output end of the second operation amplifier 331. The second judgment diode 335 has one input end coupled electrically to the output end of the third operation amplifier 332. The first judgment diode 334 has one output coupled electrically to the output end of the second judgment diode 335 for transmitting the triggering signal S6.

In addition, when electronic device is used to adjust the digital control signal S4, the first and second comparison voltages V4 and V6 and the reference voltage V5 are simultaneously adjusted, of which, the standby voltage region defined cooperatively by the first comparison voltage V4 and V6 second comparison voltages V4 and V6 alters in accordance with the adjustment of the first and second comparison voltage V4 voltage V6, thereby altering the output sensitivity of the triggering signal S6 of the sensitivity sensor system 3.

Figure 6A:
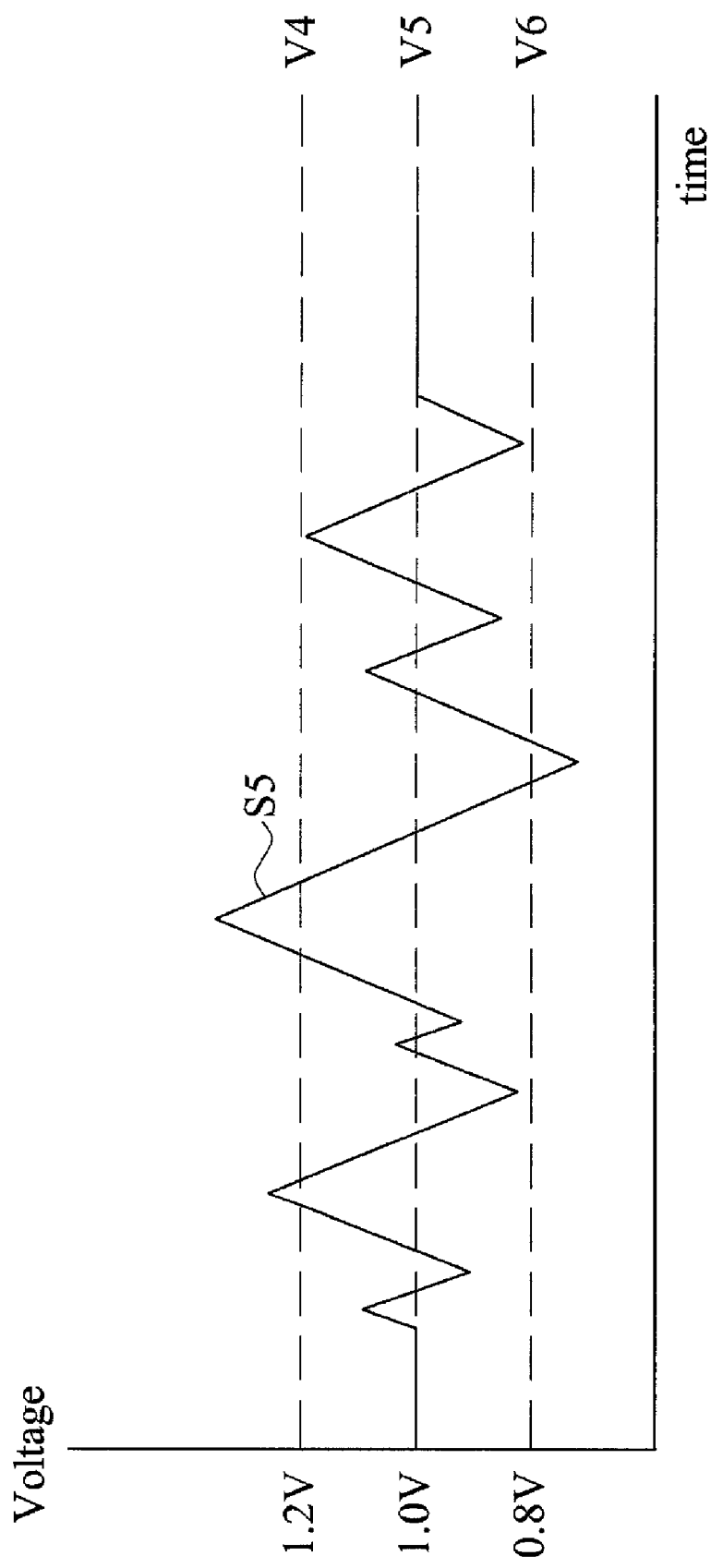
FIG. 6A shows a voltage-time graph of the first embodiment when a normalized signal in the sensor system of the present invention is at a predetermined sensitivity.

FIG. 6A shows a voltage-time graph of the first embodiment when the normalized signal S5 in the sensor system of the present invention is at a predetermined sensitivity. Also refer to FIG. 4 and as illustrated, when the first and second comparison voltages V4 and V6 and the reference voltage V5 are at 1.2 volts, 0.8 volt and 1 volt respectively. Under this condition, the first and second comparison voltages V4 and V6 cooperatively define the standby voltage region of 0.4 volt. Therefore, as shown in FIG. 6A, the fluctuation bias voltage of the normalized signal S5 is located outside of the standby voltage region defined cooperatively by the first and second comparison voltages V4 and V6 three times. Thus, the triggering signal S6 is generated three times.

Figure 6B:
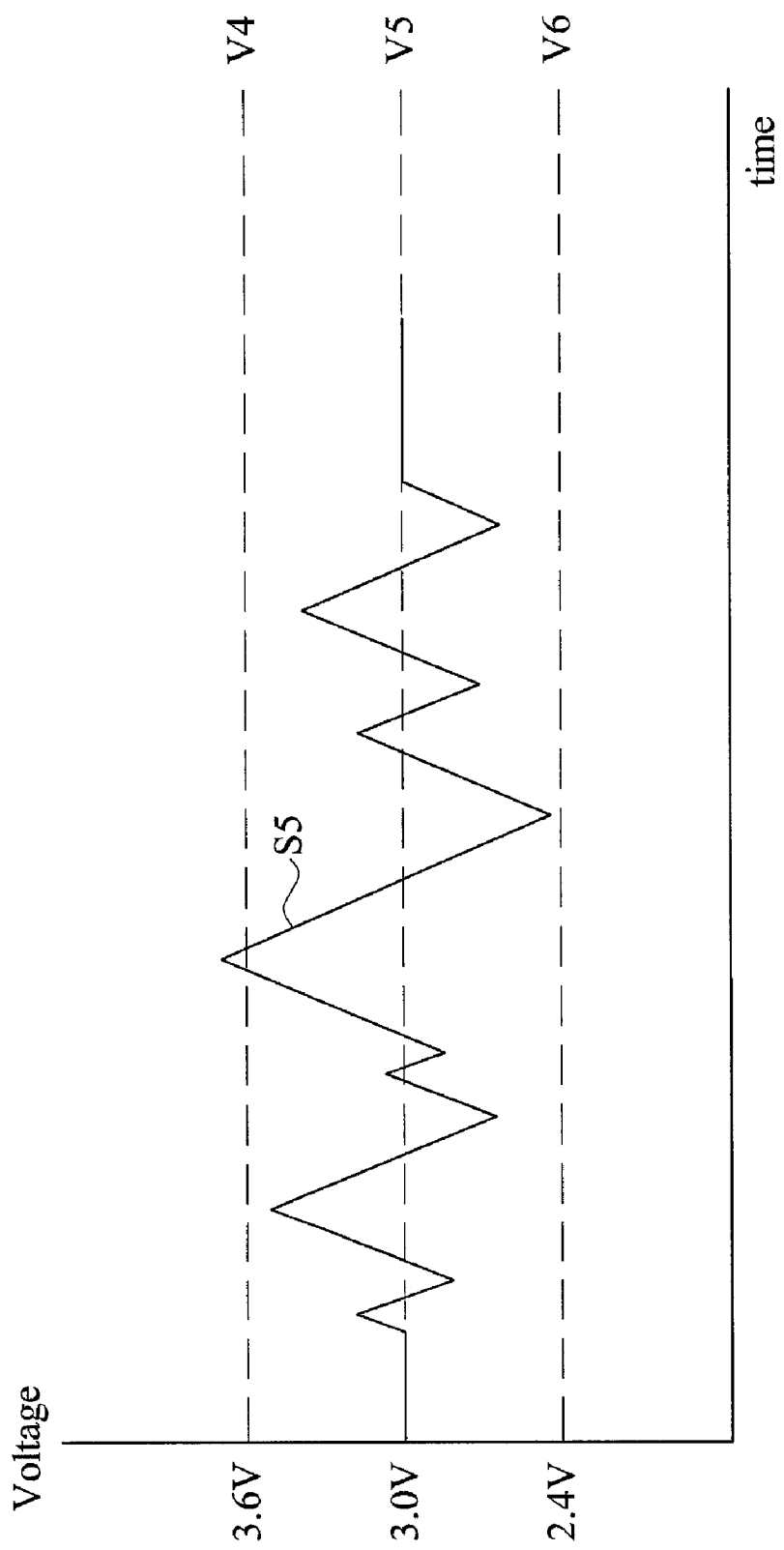
FIG. 6B shows the voltage-time graph of the first embodiment after lowering the sensitivity of the normalized signal in the sensor system of the present invention.

FIG. 6B shows the voltage-time graph of the first embodiment after lowering the sensitivity of the normalized signal in the sensor system of the present invention. Also refer to FIG. 4 and as illustrated, when it is desired to lower the sensitivity, the electronic device is used to amplify the digital control signal S4, where the first and second comparison voltages V4, V6 and the reference voltage V5 are simultaneously adjusted. Thus, the first and second comparison voltages the first and second comparison voltages V4, V6 and the reference voltage V5 are at 3.6 volts, 2.4 volts and 3 volts respectively. Under this condition and as shown in FIG. 6B, the first and second comparison voltages V4 and V6 cooperatively define the standby voltage region of 1.2 volts. So that the fluctuation bias voltage of the normalized signal S5 is located outside of the standby voltage region defined cooperatively by the first and second comparison voltages V4 and V6 only a single time. Thus, the triggering signal S6 is generated only a single time.

Figure 6C:
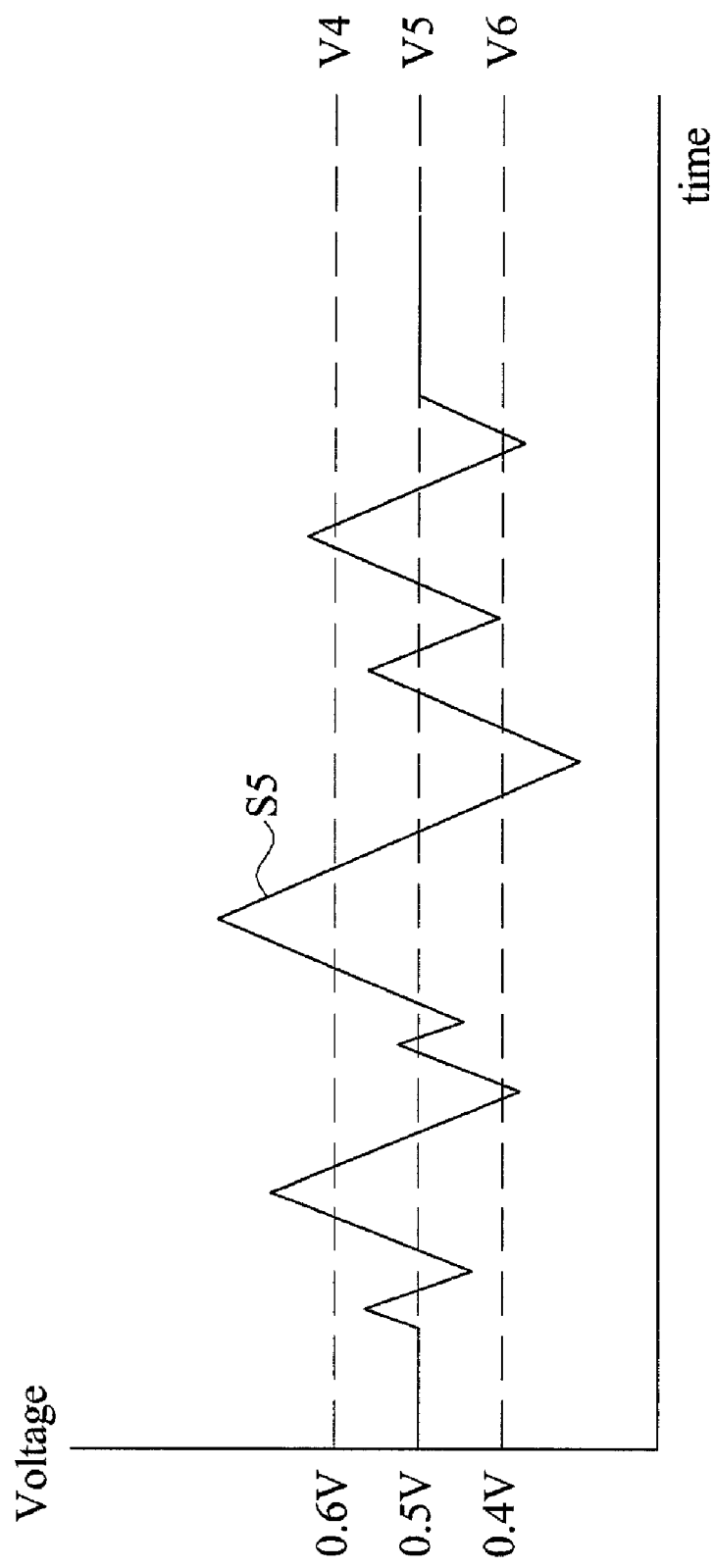
FIG. 6C shows the voltage-time graph of the first embodiment after raising the sensitivity of the normalized signal in the sensor system of the present invention.

FIG. 6C shows the voltage-time graph of the first embodiment after raising the sensitivity of the normalized signal in the sensor system 3 of the present invention. Also refer to FIG. 4 and as illustrated, when it is desired to raise the sensitivity, the electronic device is used to de-amplify the digital control signal S4, where the first and second comparison voltages V4, V6 and the reference voltage V5 are simultaneously adjusted in magnitude. Thus, the first and second comparison voltages V4, V6 and the reference voltage V5 are at 0.6 volt, 0.4 volt and 0.5 volt respectively. As shown in FIG. 6C, the first and second comparison voltages V4 and V6 cooperatively define the standby voltage region of 0.2 volt. So that the fluctuation bias voltage of the normalized signal S5 is located outside of the standby voltage region defined cooperatively by the first and second comparison voltages V4 and V6 six times. Thus, the triggering signal S6 is generated six times.

As mentioned above, in the sensitivity sensor system 3 of the present invention, by regulating the digital control signal S4, we can adjust the sensitivity of the sensor system 3, of which, by conducting analysis on the triggering frequency of the triggering signal S6, one can determine an increase in the sensitivity or a reduction in the sensitivity of the sensor system 3.

When the sensor system 3 outputs the triggering signal S6, the latter can trigger an operation system to perform a predetermined task. Then, an analysis should be conducted on the triggering frequency to determine adjustment of the sensitivity in the sensor system 3. Alternatively, an analysis should be conducted on the triggering frequency to determine the triggering signal S6 so as to adjust the sensitivity in the sensor system 3, thereby triggering an operation system to perform the predetermined task or function.

For example, in the first application, set a predetermined frequency region, where the triggering signal should be generated at preset numbers within a certain time interval. It can be set that four to five triggering signals should be generated per minute. Therefore, as shown in FIG. 6A, when the fluctuation bias voltage of the normalized signal S5 is located outside of the standby voltage region defined cooperatively by the first and second comparison voltages V4 and V6, the triggering signal S6 is generated three times within one minute, thereby triggering an operation system to perform the predetermined task.

At the same time, the sensor system 3 will decide that at every minute, the triggering signal S6 will trigger three times at a certain frequency, and figures out which frequency should be used in order to dispose the fluctuation bias voltage outside of the standby voltage region. Therefore, a high precision of the sensitivity can be achieved in the sensor system 3 of the present invention.

In addition, the adjustment of the sensitivity can be conducted through an operator, who operates the electronic device to adjust the digital control signal S4. For instance, when the operator feels lesser triggering signals from the sensor system 3, he can operates the electronic device to adjust magnitude of the triggering signal S6, thereby increasing the sensitivity thereof. On the contrary, if he feels there is too many triggering signal S6 from the sensor system 3, he can operate the electronic device to adjust the digital control signal S4 to lower the sensitivity of the sensor system 3.

Figure 7:
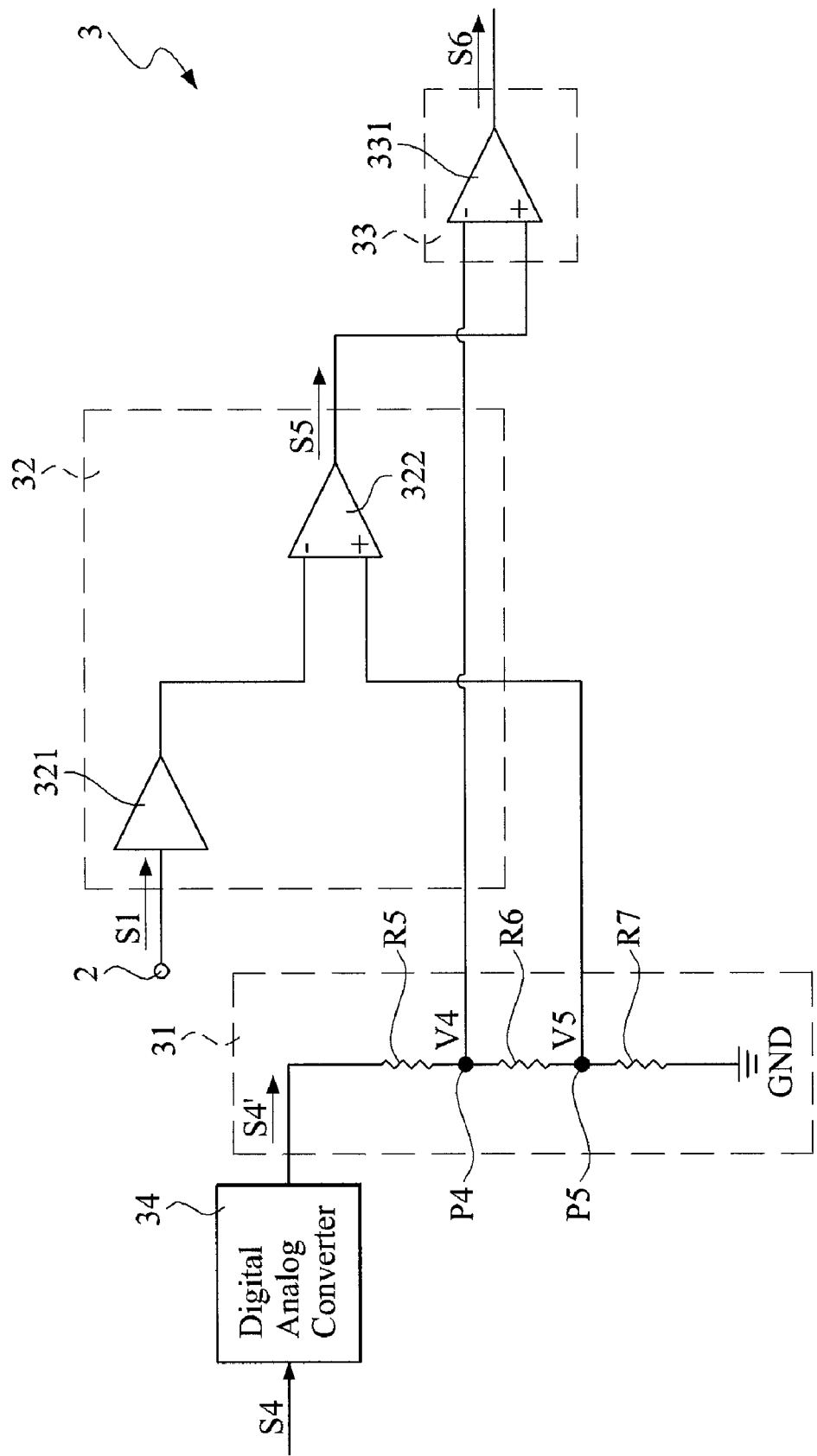
FIG. 7 shows a circuit diagram employed in third embodiment of the sensor system of the present invention.

FIG. 7 shows a circuit diagram employed in third embodiment of the sensor system of the present invention. The divider circuit 31 preferably includes three resistors R5 and R6 and R7. The DAC (digital/analog converter) 34 has one input end coupled electrically to the electronic device in order to the electronic devices delivers the digital control signal S4 to the DAC 34, where the digital control signal S4 is converted into the analog control signal S4'. The DAC 34 has an output end coupled electrically to a first end of the resistor R5 while a second end of the resistor R5 is coupled electrically to a first end of the resistor R6. The resistor R6 has a second end coupled electrically to a first end of the resistor R7. The resistor R7 has a second end coupled electrically to the ground GND.

Note that, the adjoining point of the resistors R5 and R6 serves as a first voltage contact P4, wherein the analog control signal S4' after passing through the resistor R5 and drops in voltage to form the first comparison voltage V4. The adjoining point of the resistors R6 and R7 serves as a normalized voltage contact P5, wherein the analog control signal S4' after passing through the resistors R6 and R7 and drops in voltage to form the reference voltage V5.

The normalized circuit 32 includes a first operation amplifier 321 and a normalized operation unit 322, of which, the first operation amplifier 321 has one input end coupled electrically to the input signal source 2 in order to accept the input signal S1 from the input signal source 2 and later inputs the same into the first operation amplifier 321 via the input end thereof, thereby amplifying the bias DC and the fluctuation bias voltage of the input signal S1 and outputting through an output end of the first operation amplifier 321.

The normalized operation unit 322 has one input end coupled electrically to the normalized voltage contacts P5, another input end coupled electrically to the output end of the first operation amplifier 321 to normalize the voltage according to the reference voltage V5 and amplify the bias DC of the input signal S1 to form the normalized voltage V5, and normally adjusting synchronization of the fluctuation bias voltage of the input signal S1 with the bias DC, thereby producing the normalized signal S5, which is transmitted via the output of the normalized operation unit 322.

The comparison circuit 33 includes a second operation amplifier 331, wherein the second operation amplifier 331 has one input end coupled electrically to the first voltage contact P4, another input end coupled electrically to the output end of the normalized operation unit 322 so as to enable the second operation amplifier 331 to achieve the first comparison voltage V4 and the fluctuation voltage of the normalized signal S5 so as to determine whether the fluctuation voltage of normalized signal S5 is located within the standby voltage region. Thus, the fluctuation voltage of normalized signal S5 is determined whether higher than that of the first comparison voltage V4.

In case, the fluctuation voltage of the normalized signal S5 is located outside of the standby voltage region and is higher than that of the first comparison voltage V4, the sensor system 3 outputs the triggering signal S6. When the electronic device is used to adjust the digital control signal S4, the first comparison voltage V4 and the reference voltage V5 are simultaneously adjusted in order the sensor system 3 outputs the triggering signal S6.

Figure 8A:
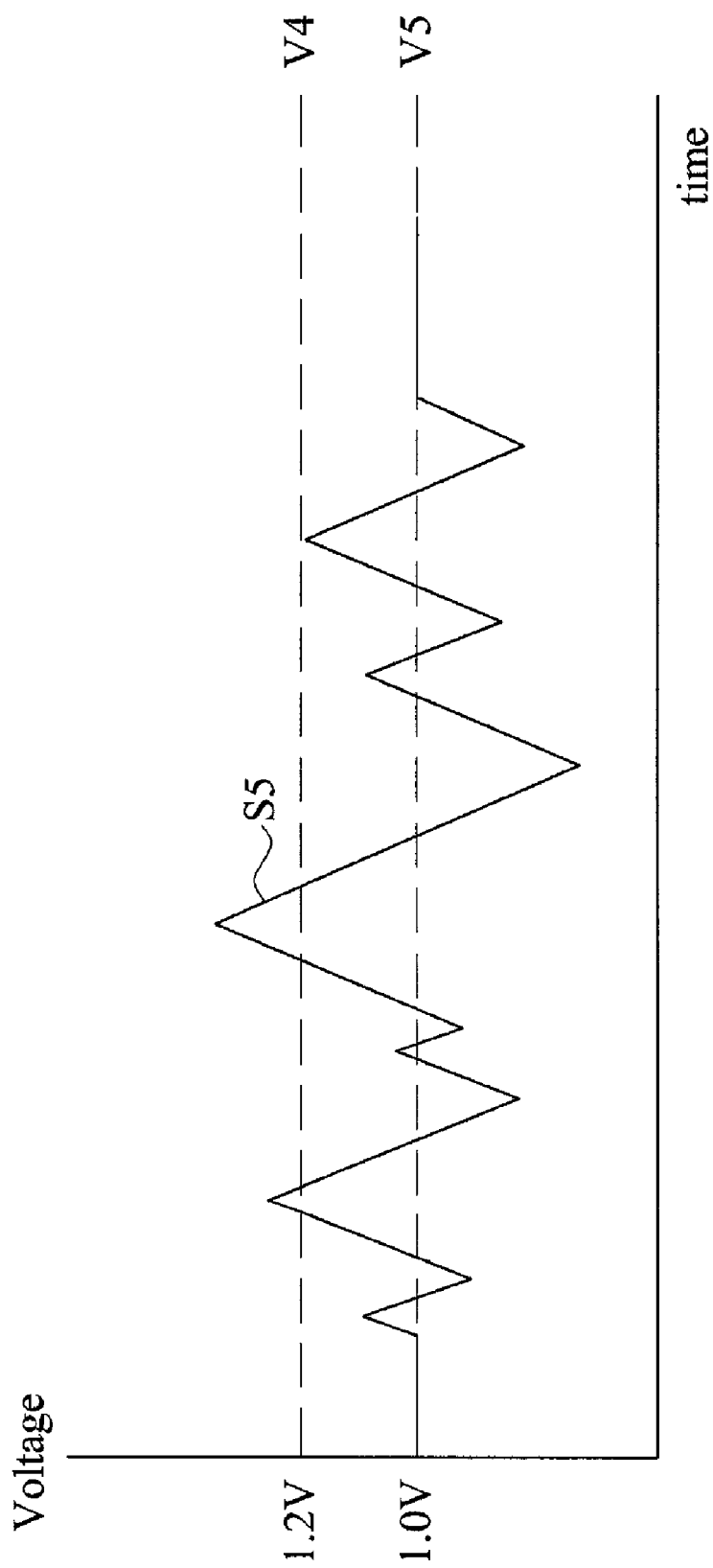
FIG. 8A shows a voltage-time graph of the third embodiment when the normalized signal in the sensor system of the present invention is at a predetermined sensitivity.

FIG. 8A shows a voltage-time graph of the third embodiment when the normalized signal S5 in the sensor system of the present invention is at a predetermined sensitivity. Also refer to FIG. 7 and as illustrated, the first comparison voltage V4 and the reference voltage V5 are at 1.2 volts and 1 volt respectively. As shown in FIG. 8A, the fluctuation voltage of the normalized signal S5 is twice higher than the first comparison voltage V4. Under this condition, the triggering signal S6 is generated twice.

Figure 8B:
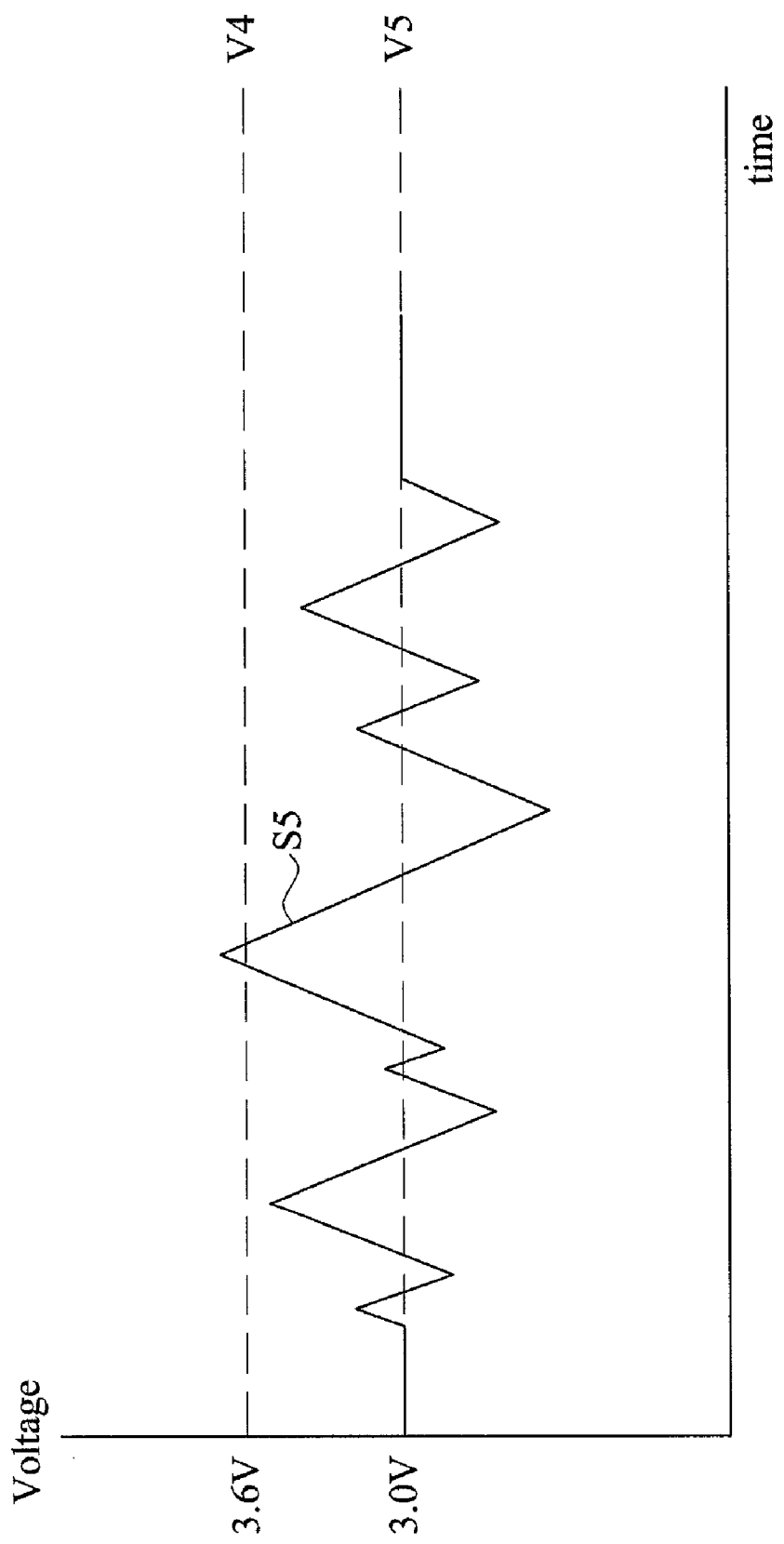
FIG. 8B shows the voltage-time graph of the third embodiment after lowering the sensitivity of the normalized signal in the sensor system of the present invention.

FIG. 8B shows the voltage-time graph of the third embodiment after lowering the sensitivity of the normalized signal S5 in the sensor system of the present invention. Also referring to FIG. 7 and as illustrated, when it is desired to lower the sensitivity of the sensor system, one can operates the electronic device to increase the magnitude of the digital control signal S4, where the magnitude of the first comparison voltage V4 and the reference voltage V5 are simultaneously increased. Under this condition, the first comparison voltage V4 and the reference voltage V5 are at 3.6 volts and 3 volts respectively. Therefore, as illustrated in FIG. 8B, the fluctuation voltage of the normalized signal of S5 is higher than that the first comparison V4 only a single time and hence only a single triggering signal S6 is generated.

Figure 8C:
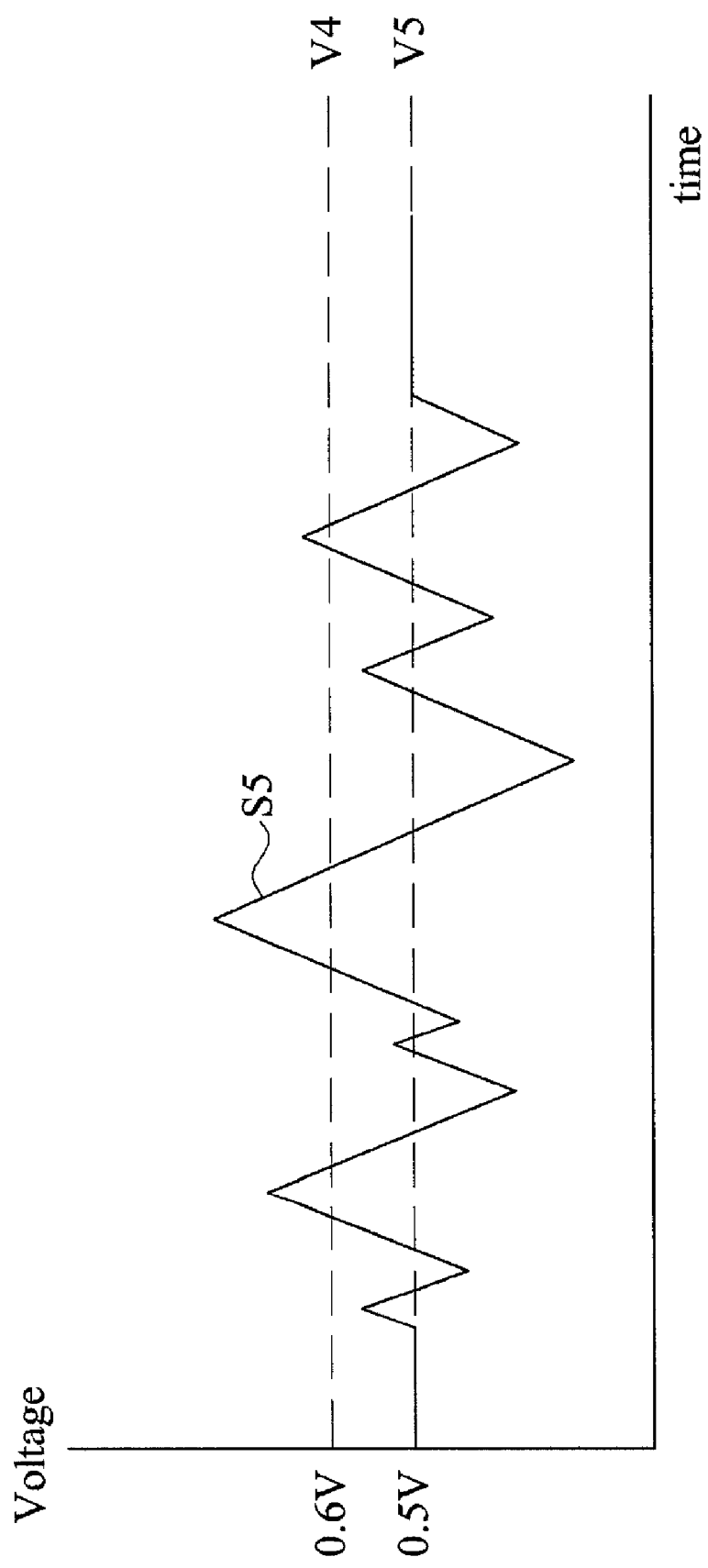
FIG. 8C shows the voltage-time graph of the third embodiment after raising the sensitivity of the normalized signal in the sensor system of the present invention.

FIG. 8C shows the voltage-time graph of the third embodiment after raising the sensitivity of the normalized signal S5 in the sensor system of the present invention. Also refer to FIG. 7 and as illustrated, when it is desired to raise the sensitivity, the electronic device is used to de-amplify the digital control signal S4, where the first and second comparison voltages V4, V6 and the reference voltage V5 are simultaneously lowered in magnitude. Thus, the first comparison voltage V4 and the reference voltage V5 are at 0.6 volt and 0.5 volt respectively. As shown in FIG. 8C, the fluctuation bias voltage of the normalized signal S5 is higher than that of the first comparison voltage V4 and hence the triggering signal S6 is generated three times.

Figure 9:
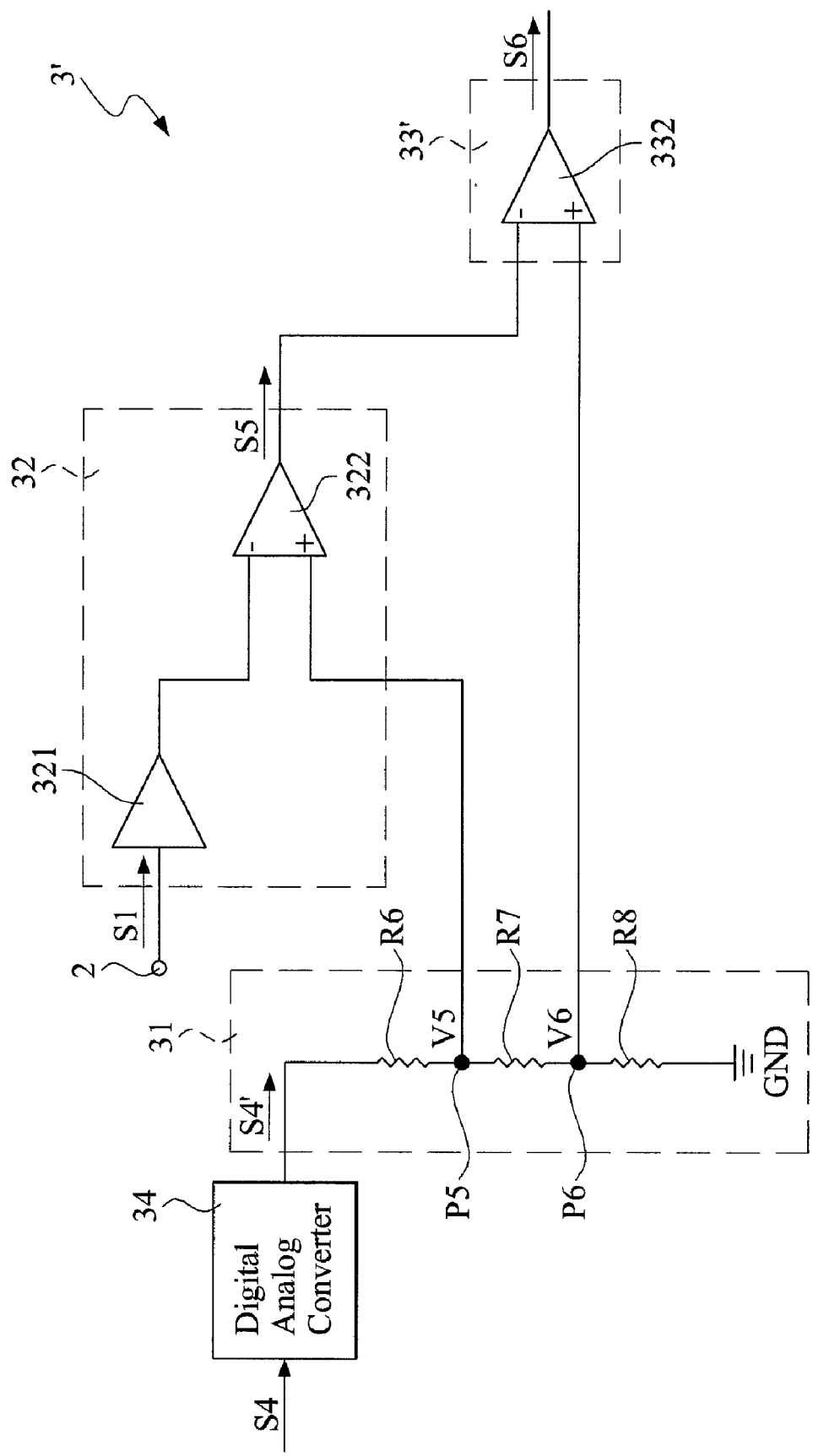
FIG. 9 shows a circuit diagram employed in a fourth embodiment of the sensor system of the present invention.

FIG. 9 shows a circuit diagram employed in a fourth embodiment of the sensor system of the present invention. As illustrated, the divider circuit 31 preferably includes three resistors R6, R7, R8. The DAC (digital/analog converter) 34 has an input end coupled electrically to the electronic device in order to enable electronic device delivers the digital control signal S4 into the DAC (digital/analog converter) 34, where the digital control signal S4 is converted into the analog control signal S4'. The DAC (digital/analog converter) 34 has an output end coupled electrically to a first end of the resistor R6 while a second end of the resistor R6 is coupled electrically to a first end of the resistor R7, which has a second end coupled electrically to a first end of the resistor R8. The resistor R8 has a second end coupled electrically to the ground GND.

Note that, the adjoining point of the resistors R6 and R7 serves as the normalized voltage contact P5, wherein the analog control signal S4' after passing through the resistor R6 and drops in voltage to form the reference voltage V5. The adjoining point of the resistors R7 and R8 serves as the first voltage contact P4, wherein the analog control signal S4' after passing through the resistors R6 and R7 and drops in voltage to form the first comparison voltage V4.

The normalized circuit 32 includes the first operation amplifier 321 and the normalized operation unit 322, of which, the first operation amplifier 321 has one input end coupled electrically to the input signal source 2 in order to accept the input signal S1 from the input signal source 2 and later inputs the same into the first operation amplifier 321 via the input end thereof, thereby amplifying the bias DC and the fluctuation bias voltage of the input signal S1 and outputting through an output end of the first operation amplifier 321.

The normalized operation unit 322 has one input end coupled electrically to the normalized voltage contacts P5, another input end coupled electrically to the output end of the first operation amplifier 321 to normalize the voltage according to the reference voltage V5 and amplify the bias DC of the input signal S1 to form the normalized voltage V5, and normally adjusting synchronization of the fluctuation bias voltage of the input signal S1 with the bias DC, thereby producing the normalized signal S5, which is transmitted via the output of the normalized operation unit 322.

The comparison circuit 33 preferably includes the second operation amplifier 331, wherein the second operation amplifier 331 has one input end coupled electrically to the first voltage contact P4, another input end coupled electrically to the output end of the normalized operation unit 322 so as to enable the second operation amplifier 331 to achieve the first comparison voltage V4 and the fluctuation voltage of the normalized signal S5 so as to determine whether the fluctuation voltage of normalized signal S5 is located within the standby voltage region. Thus, the fluctuation voltage of normalized signal S5 is determined whether higher than that of the first comparison voltage V4.

In case, the fluctuation voltage of the normalized signal S5 is located outside of the standby voltage region and is lower than that of the first comparison voltage V4, the sensor system 3 outputs the triggering signal S6. When the electronic device is used to adjust the digital control signal S4, the first comparison voltage V4 and the reference voltage V5 are simultaneously adjusted in order the sensor system 3 outputs the triggering signal S6.

Figure 10A:
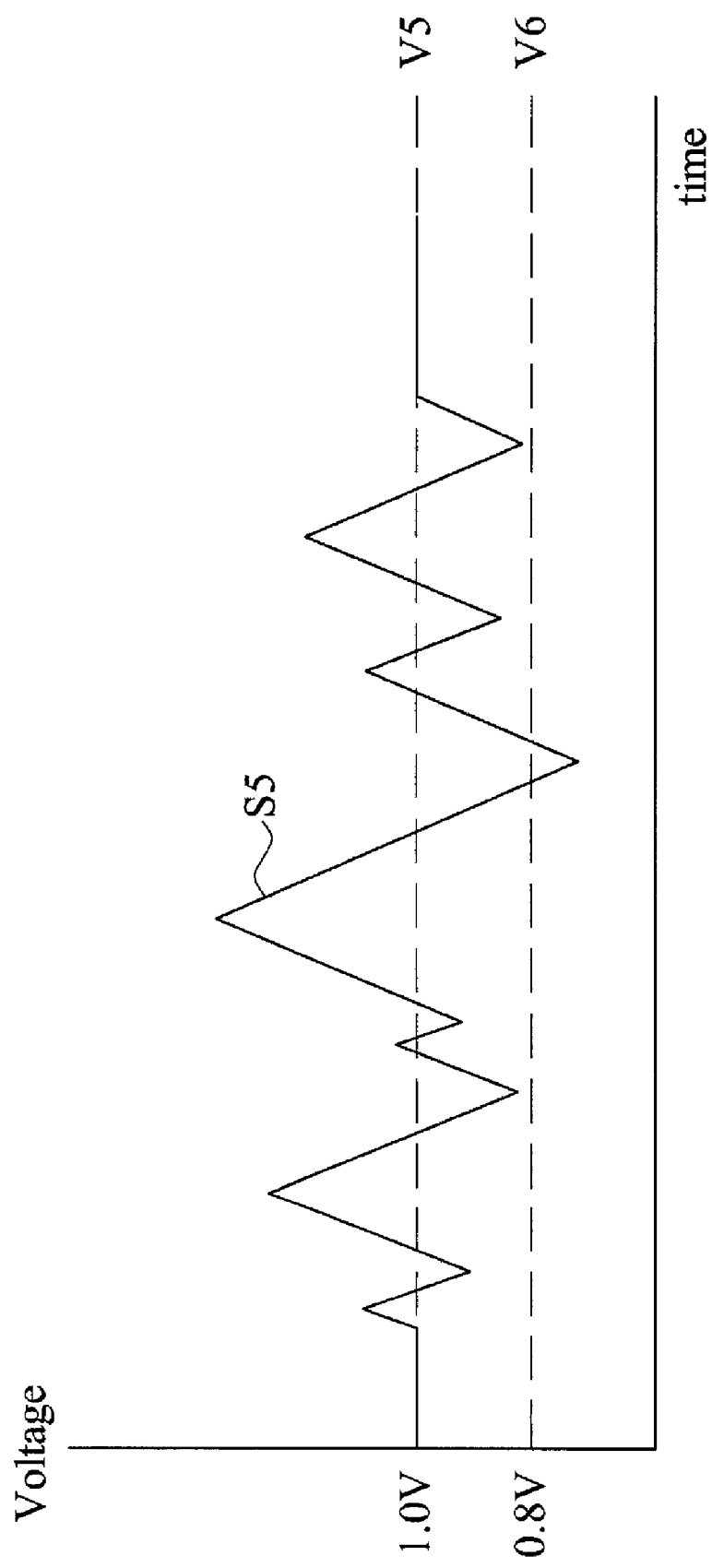
FIG. 10A shows a voltage-time graph of the fourth embodiment when the normalized signal in the sensor system of the present invention is at a predetermined sensitivity.

FIG. 10A shows a voltage-time graph of the fourth embodiment when the normalized signal S5 in the sensor system of the present invention is at a predetermined sensitivity. Also refer to FIG. 9 and as illustrated, the first comparison voltage V4 and the reference voltage V5 are at 0.8 volt and 1.2 volts respectively. As shown in FIG. 10A, the fluctuation voltage of the normalized signal S5 is lower than the second comparison voltage V6 only for a single time. Under this condition, the triggering signal S6 is generated only for a single time.

Figure 10B:
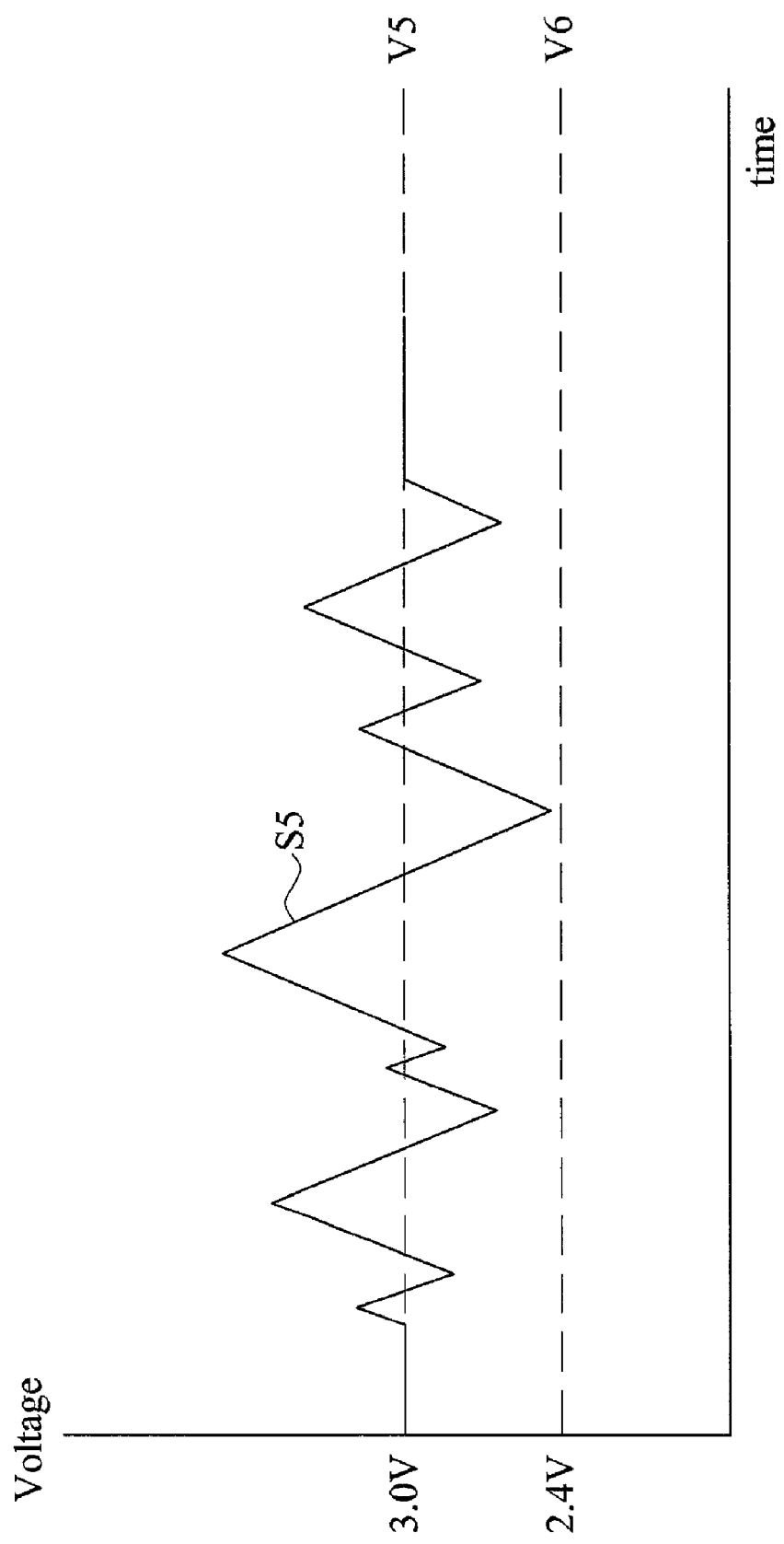
FIG. 10B shows the voltage-time graph of the fourth embodiment after lowering the sensitivity of the normalized signal in the sensor system of the present invention.

FIG. 10B shows the voltage-time graph of the fourth embodiment after lowering the sensitivity of the normalized signal S5 in the sensor system of the present invention. Also referring to FIG. 9 and as illustrated, when it is desired to lower the sensitivity of the sensor system, one can operates the electronic device to increase the magnitude of the digital control signal S4, where the magnitude of the first comparison voltage V4 and the reference voltage V5 are simultaneously increased. Under this condition, the first comparison voltage V4 and the reference voltage V5 are at 2.4 volts and 3 volts respectively. Therefore, as illustrated in FIG. 10B, the fluctuation voltage of the normalized signal of S5 is lower than that the second comparison V64 and no triggering signal S6 is generated.

Figure 10C:
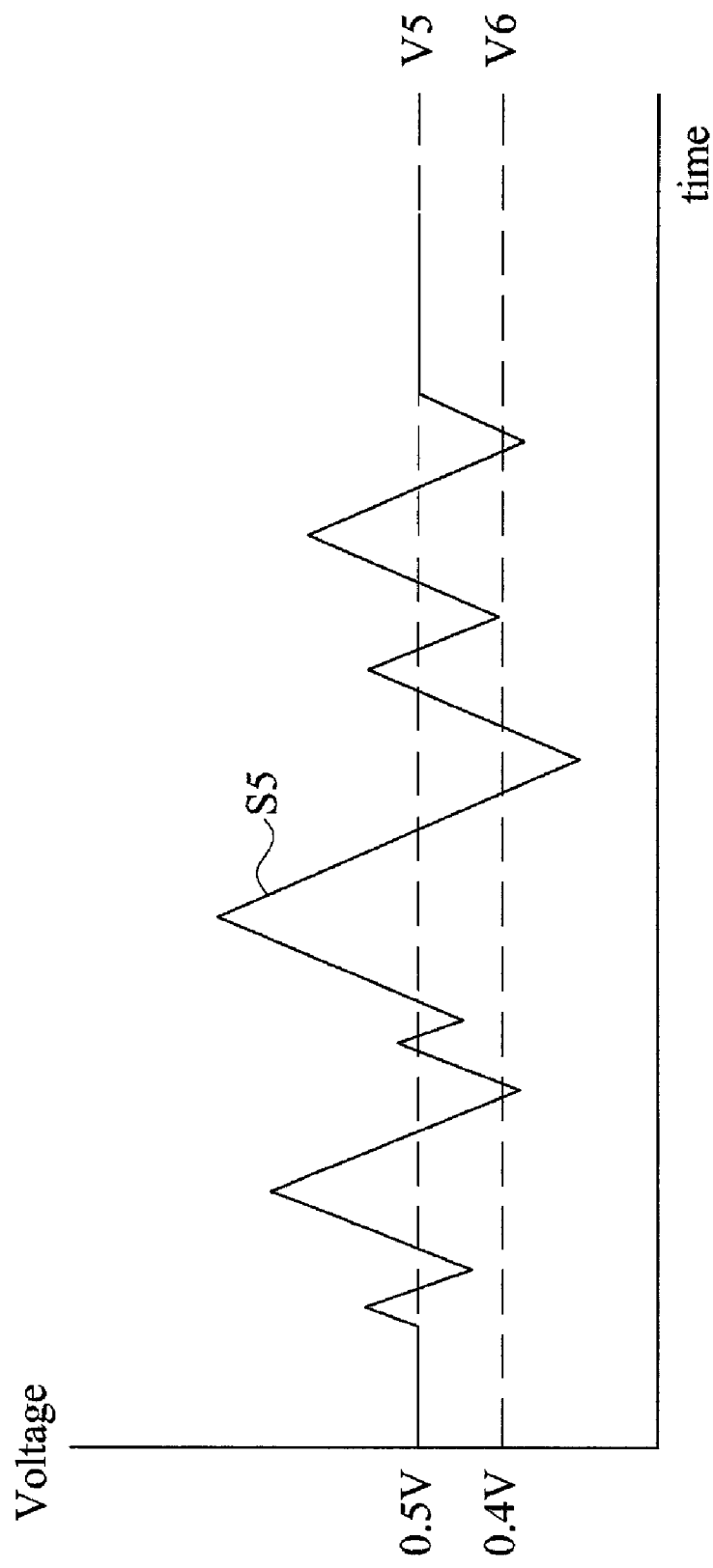
FIG. 10C shows the voltage-time graph of the fourth embodiment after raising the sensitivity of the normalized signal in the sensor system of the present invention.

FIG. 10C shows the voltage-time graph of the fourth embodiment after raising the sensitivity of the normalized signal S5 in the sensor system of the present invention. Also refer to FIG. 9 and as illustrated, when it is desired to raise the sensitivity, the electronic device is used to de-amplify the digital control signal S4, where the first comparison voltage V4 and the reference voltage V5 are simultaneously lowered in magnitude. Thus, the first comparison voltage V4 and the reference voltage V5 are at 0.4 volt and 0.5 volt respectively. As shown in FIG. 10C, the fluctuation bias voltage of the normalized signal S5 is higher than that of the second comparison voltage V64 for three times and hence the triggering signal S6 is generated three times.

In addition, the adjusting method of the fourth embodiment is similar to that of the first embodiment so that a detailed description thereof is not repeated herein for the sake of brevity.

Figure 11A:
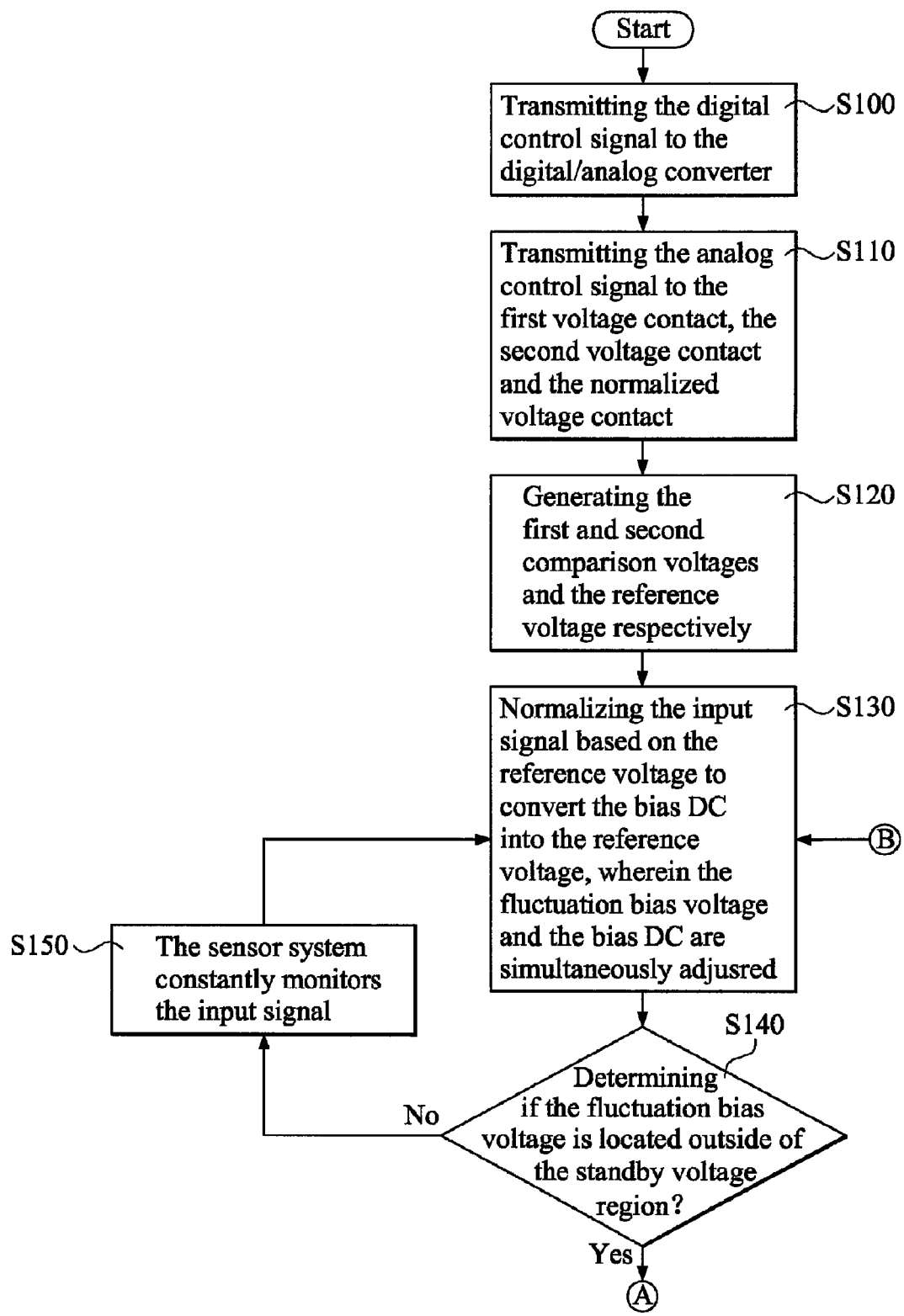
FIGS. 11A and 11B respectively show the flow chart of the first and second applications of the method for adjusting the sensitivity in a sensor device according to the present invention.
Figure 11B:
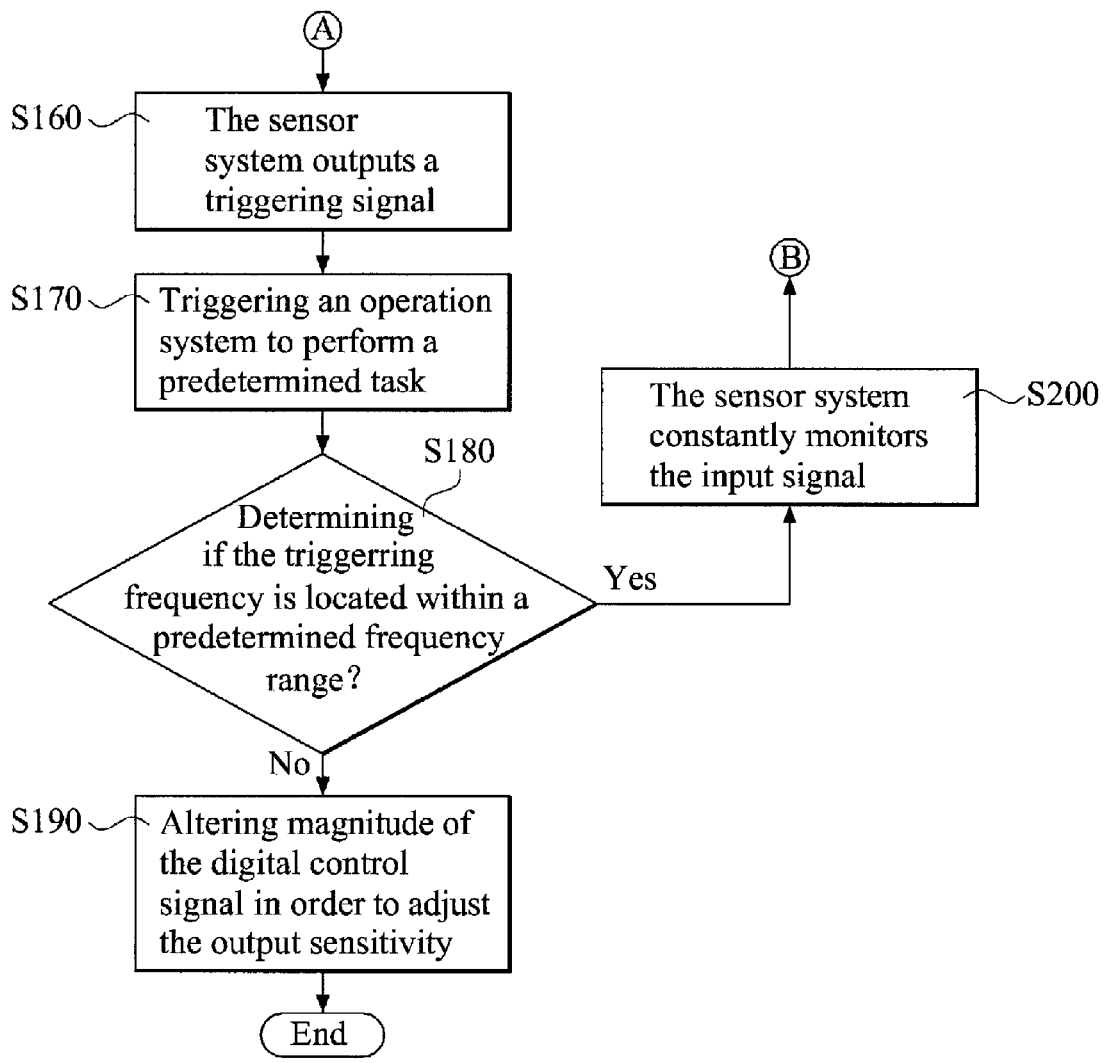

FIGS. 11A and 11B respectively show the flow chart of the first and second applications of the method for adjusting the sensitivity in a sensor device according to the present invention and also see FIG. 4.

According to step S100: the digital control signal S4 is transmitted to the DAC (digital/analog converter) 34, where the digital control signal S4 is converted into the analog control signal S4'.

According to step S110: the analog control signal S4' is transmitted to the first voltage contact P4, the second voltage contact P6 and the normalized voltage contact P5.

According to step S120: the first comparison voltage V4, the second comparison voltage V6 and the reference voltage V5 are generated respectively.

According to step S130: the input signal S1 is normalized based on the reference voltage V5 so as to convert the bias DC into the reference voltage V5, wherein the fluctuation bias voltage and the bias DC are simultaneously adjusted.

According to step S140: determining whether the fluctuation bias voltage of the input signal S1 is located outside of the standby voltage region or not.

According to step S150: when the fluctuation bias voltage of the input signal S1 is located outside of the standby voltage region, the sensor system 3 constantly monitors the input signal S1.

According to step S160: in the event, the fluctuation bias voltage of the input signal S1 is located outside of the standby voltage region, the sensor system 3 outputs a triggering signal S6.

According to step S170: the triggering signal S6 triggers an operation system to perform a predetermined task.

According to step S180: an analysis is conducted regarding the triggering frequency range to determine whether the triggering frequency is located within a predetermined frequency region or not.

According to step S190: when the triggering frequency is located outside of the predetermined frequency region, the digital control signal S4 is adjusted in order to alter the output sensitivity of the sensor system.

According to step S200: when the triggering frequency is located within the predetermined frequency region, the sensor system 3 constantly monitors the input signal S1.

Figure 12A:
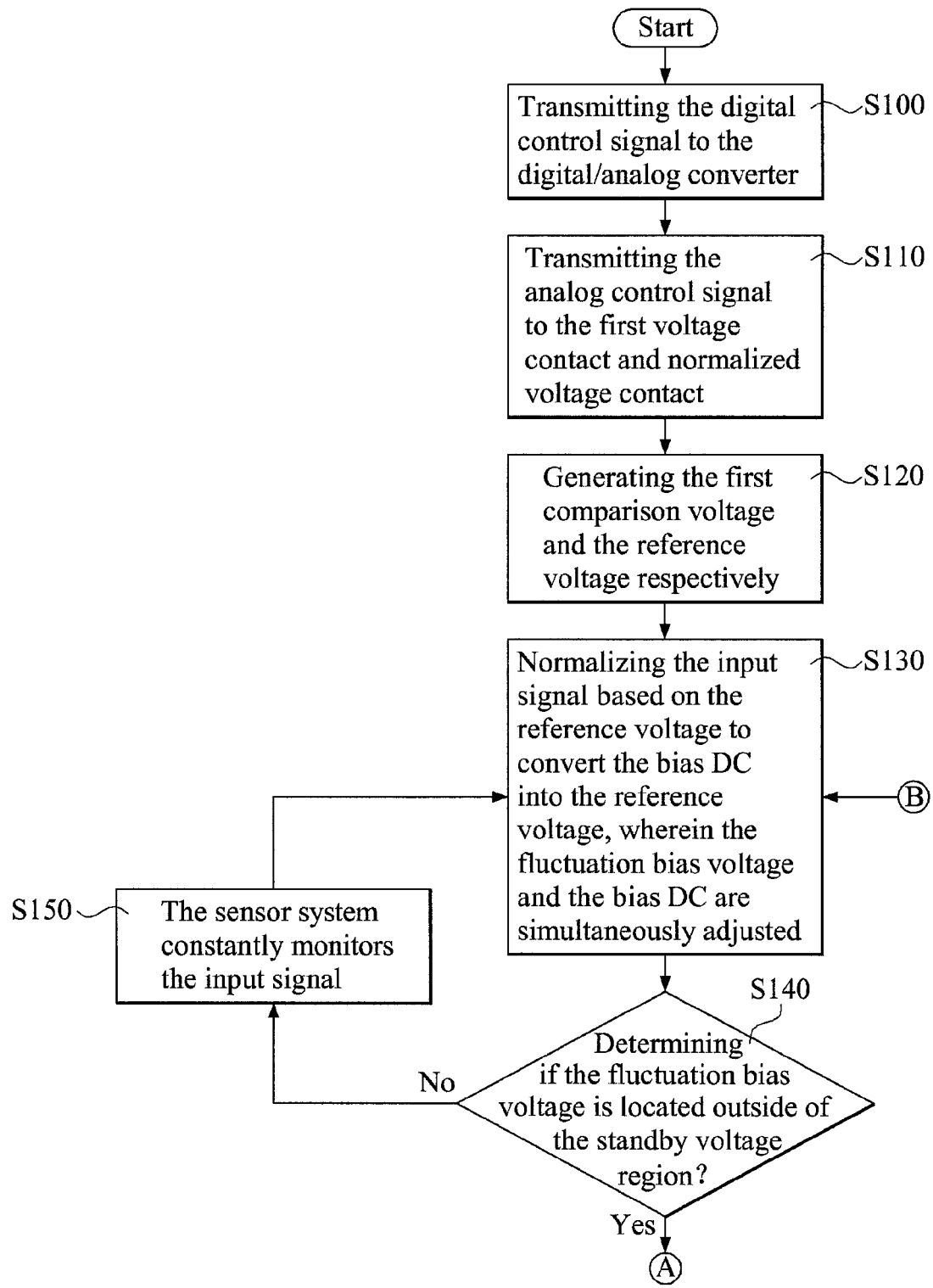
FIGS. 12A and 12B respectively show the flow chart of the third application of the method for adjusting the sensitivity in the sensor device according to the present invention.
Figure 12B:
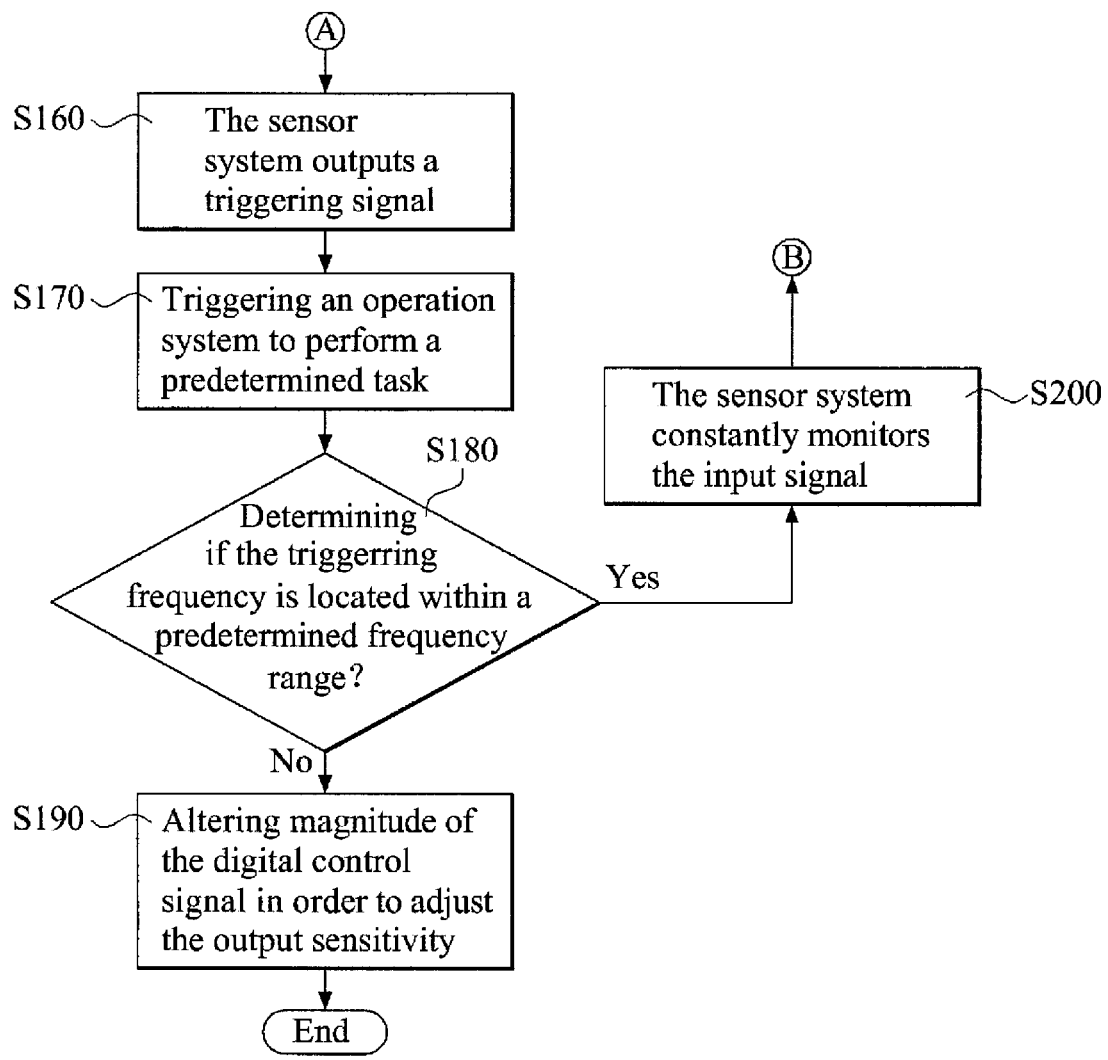

FIGS. 12A and 12B respectively show the flow chart of the third application of the method for adjusting the sensitivity in the sensor device according to the present invention and also see FIG. 4.

According to step S100: the digital control signal S4 is transmitted to the DAC (digital/analog converter) 34, where the digital control signal S4 is converted into the analog control signal S4'.

According to step S110: the analog control signal S4' is transmitted to the first voltage contact P4 and the normalized voltage contact P5.

According to step S120: the first comparison voltage V4 and the reference voltage V5 are generated respectively.

According to step S130: the input signal S1 is normalized based on the reference voltage V5 so as to convert the bias DC into the reference voltage V5, wherein the fluctuation bias voltage and the bias DC are simultaneously adjusted.

According to step S140: determining whether the fluctuation bias voltage of the input signal 51 is located outside of the standby voltage region or not.

According to step S150: when the fluctuation bias voltage of the input signal S1 is located outside of the standby voltage region, the sensor system 3 constantly monitors the input signal S1.

According to step S160: in the event, the fluctuation bias voltage of the input signal S1 is located outside of the standby voltage region, the sensor system 3 outputs the triggering signal S6.

According to step S170: the triggering signal S6 triggers an operation system to perform a predetermined task.

According to step S180: an analysis is conducted regarding the triggering frequency range to determine whether the triggering frequency is located within a predetermined frequency region or not.

According to step S190: when the triggering frequency is located outside of the predetermined frequency region, the digital control signal S4 is adjusted in order to alter the output sensitivity of the sensor system.

According to step S200: when the triggering frequency is located within the predetermined frequency region, the sensor system 3 constantly monitors the input signal S1.

Figure 13A:
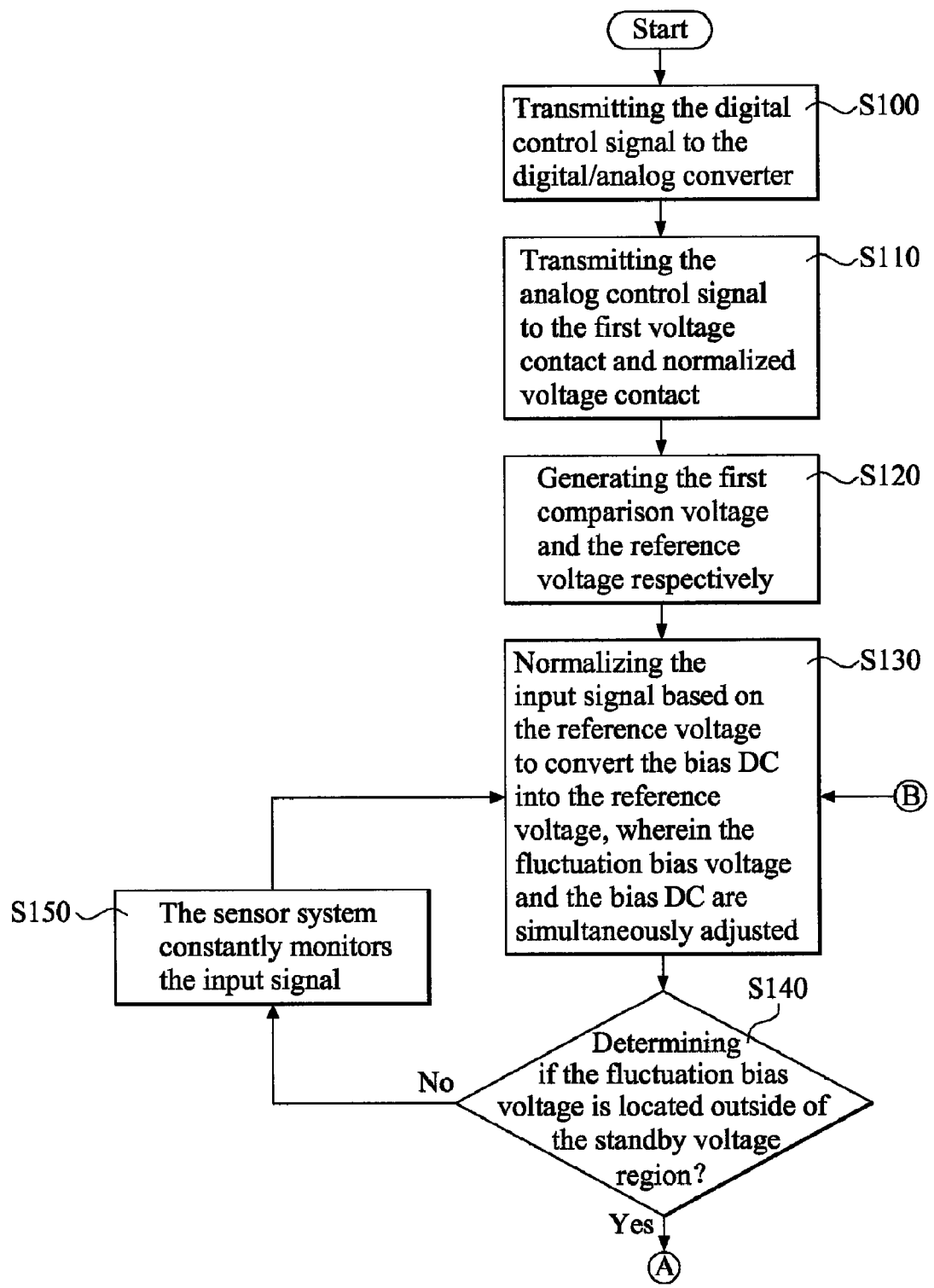
FIGS. 13A and 13B respectively show the flow chart of the fourth application of the method for adjusting the sensitivity in the sensor device according to the present invention.
Figure 13B:
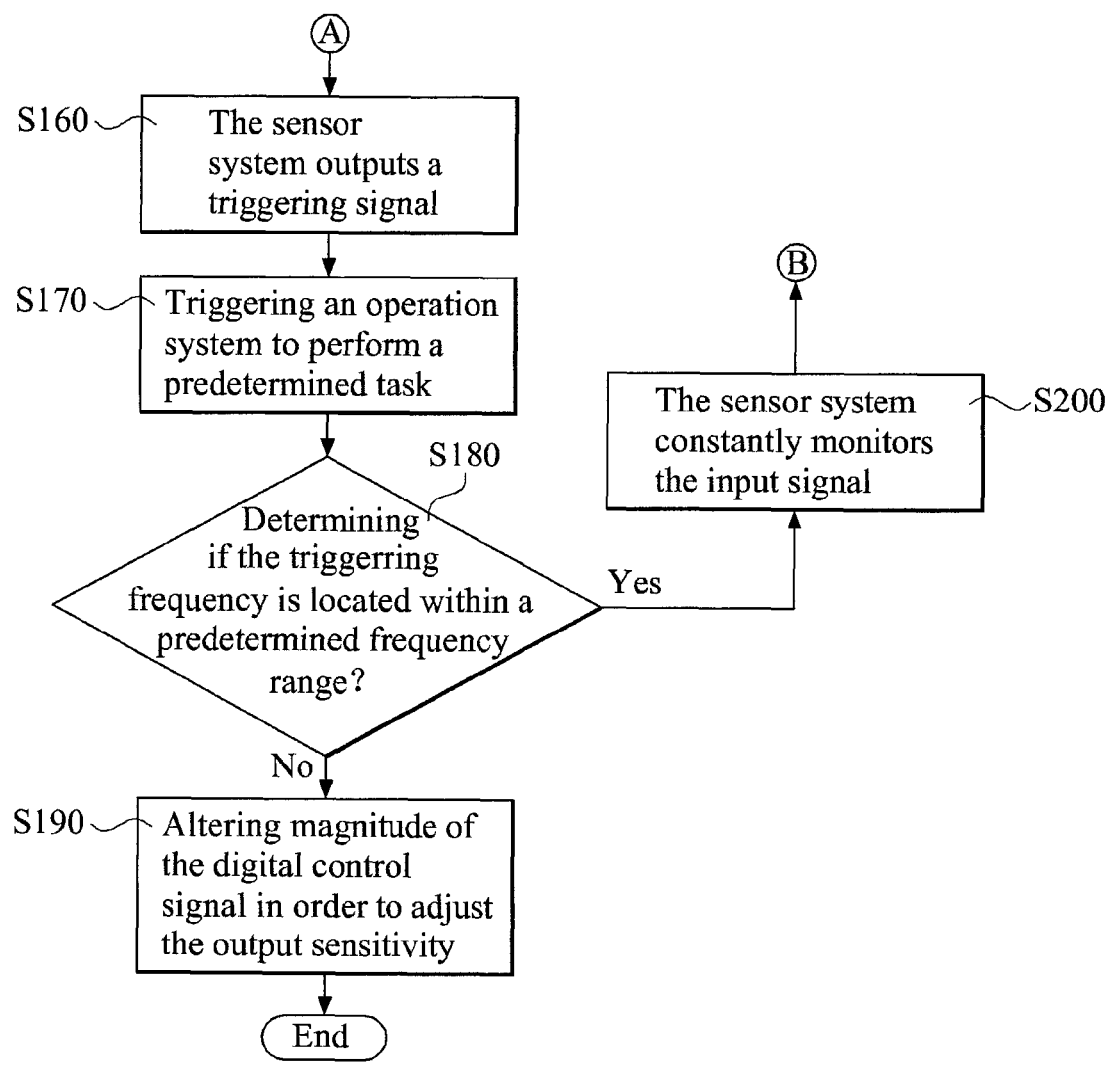

FIGS. 13A and 13B respectively show the flow chart of the fourth application of the method for adjusting the sensitivity in the sensor device according to the present invention.

According to step S100: the digital control signal S4 is transmitted to the DAC (digital/analog converter) 34, where the digital control signal S4 is converted into the analog control signal S4'.

According to step S110: the analog control signal S4' is transmitted to the first voltage contact P4 and the normalized voltage contact P5.

According to step S120: the first comparison voltage V4 and the reference voltage V5 are generated respectively.

According to step S130: the input signal S1 is normalized based on the reference voltage V5 so as to convert the bias DC into the reference voltage V5, wherein the fluctuation bias voltage and the bias DC are simultaneously adjusted.

According to step S140: determining whether the fluctuation bias voltage of the input signal S1 is located outside of the standby voltage region or not.

According to step S150: when the fluctuation bias voltage of the input signal S1 is located outside of the standby voltage region, the sensor system 3 constantly monitors the input signal S1.

According to step S160: in the event, the fluctuation bias voltage of the input signal S1 is located outside of the standby voltage region, the sensor system 3 outputs the triggering signal S6.

According to step S170: the triggering signal S6 triggers an operation system to perform a predetermined task.

According to step S180: an analysis is conducted regarding the triggering frequency range to determine whether the triggering frequency is located within a predetermined frequency region or not.

According to step S190: when the triggering frequency is located outside of the predetermined frequency region, the digital control signal S4 is adjusted in order to alter the output sensitivity of the sensor system.

According to step S200: when the triggering frequency is located within the predetermined frequency region, the sensor system 3 constantly monitors the input signal S1.

In the prior art sensor system a variable resistor is used for adjustment of the sensitivity of the sensor device. In contrast, a digital control signal S4 is used in the present sensor system for triggering the triggering signal S6 for adjusting the sensitivity of the sensor device. Thus, it is obvious that the layout area in the printed circuit board to be implemented in the sensor device of the present invention can be minimized. At the same time, the problem of mechanical damage done onto the variable resistor as in the prior art can be avoided and hence the expense for purchase of the variable resistor can also be reduced accordingly.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A sensor system for receiving an input signal and applying a digital control signal to adjust an output sensitivity of a triggering signal within the sensor system, the input signal including a bias DC (direct current) and a fluctuation bias voltage, the sensor system comprising:
    a first voltage contact for providing a first comparison voltage based on the digital control signal, said first comparison voltage defining a standby voltage region;
    a normalized voltage contact for providing a reference voltage based on the digital control signal, said reference voltage being located within said standby voltage region;
    a normalized circuit coupled electrically to said normalized voltage contact for normalizing the bias DC into said reference voltage so as to normally adjusting synchronization of the fluctuation bias voltage with the bias DC, said normalized circuit includes a normalized operation unit coupled electrically to said normalized voltage contact and an input signal source for normalizing the bias DC into said reference voltage, said normalized circuit includes a first operation amplifier coupled electrically to an adjoining area between said input signal source and said normalized operation unit for amplifying the bias DC firstly and secondly by said normalized operation unit so as to normalize the bias DC into said reference voltage; and
    a comparison circuit coupled electrically to said normalized circuit and said first voltage contact for determining after normalizing the bias DC into said reference voltage whether the fluctuation bias voltage is located within said standby voltage region or not;
    wherein, when the fluctuation bias voltage is located outside of said standby voltage region, the sensor system outputs the triggering signal so as to adjust the digital control signal, where said first comparison voltage and said reference voltage are simultaneously adjusted, thereby achieving adjustment of the output sensitivity.

2. The sensor system as defined in claim 1, wherein said standby voltage region is smaller than or equal to a voltage collection region of said first comparison voltage.

3. The sensor system as defined in claim 1, wherein said comparison circuit includes:
    a second operation amplifier coupled electrically to said first voltage contact and said normalized circuit for achieving said first comparison voltage and the fluctuation bias voltage passing through a normalization process, said second operation amplifier being used for determining whether the fluctuation bias voltage is located within said standby voltage region or not.

4. The sensor system as defined in claim 1, wherein said first voltage contact and said normalized voltage contact are coupled together in series so to form a voltage divider circuit, which, after receipt of the digital control signal, generates said first comparison voltage and said reference voltage respectively.

5. The sensor system as defined in claim 4, wherein the digital control signal is transmitted to said voltage divider circuit via a DAC (Digital-to-Analog Converter).

6. The sensor system as defined in claim 1, wherein said standby voltage region is greater than or equal to a voltage collection region of said first comparison voltage.

7. The sensor system as defined in claim 6, wherein said comparison circuit further includes:
    a second operation amplifier coupled electrically to said first voltage contact and said normalized circuit for achieving said first comparison voltage and the fluctuation bias voltage passing through a normalization process, said second operation amplifier being used for determining whether the fluctuation bias voltage is located within said standby voltage region or not.

8. The sensor system as defined in claim 6, wherein said normalized voltage contact and said first voltage contact are coupled in series so as to form a voltage divider circuit, which, after receipt of the digital control signal, generates said first comparison voltage and said reference voltage respectively.

9. The sensor system as defined in claim 8, wherein the digital control signal is transmitted to said voltage divider circuit via a DAC (Digital-to-Analog Converter).

10. The sensor system as defined in claim 1, further comprising a second voltage contact for providing a second comparison voltage based on the digital control signal, said second comparison voltage cooperating with said first comparison voltage to define said standby voltage region.

11. The sensor system as defined in claim 10, wherein said comparison circuit is a window-type comparator including:
    a second operation amplifier coupled electrically to said first voltage contact and said normalized circuit for achieving said first comparison voltage and the fluctuation bias voltage passing through a normalization process;
    a third operation amplifier coupled electrically to said second voltage contact and said normalized circuit for achieving said second comparison voltage and the fluctuation bias voltage passing through said normalization process; and
    a digital logic member coupled respectively to said second operation amplifier and said third operation amplifier for determining whether the fluctuation bias voltage is located within said standby voltage region defined cooperatively by said first and second comparison voltages.

12. The sensor system as defined in claim 10, wherein said first voltage contact, said normalized voltage contact and said second voltage contact are coupled in series to form a voltage divider circuit, which, after receipt of the digital control signal, generates said first comparison voltage, said second comparison voltage and said reference voltage respectively.

13. The sensor system as defined in claim 12, wherein the digital control signal is transmitted to said voltage divider circuit via a DAC (Digital-to-Analog Converter).

14. The sensor system as defined in claim 1, wherein the sensor system is an IR sensitivity surveillance system or an infra-red network monitor.

15. A sensitivity adjustment method for applying in a sensor system as defined in claim 1, comprising the steps of:
    (a) transmitting the digital control signal to a DAC (Digital-to-Analog Converter);
    (b) applying said DAC to convert the digital control signal into an analog control signal and transmitting said analog control signal to said first voltage contact and said normalized voltage contact;
    (c) generating said first comparison voltage and said reference voltage based on said analog control signal; and (d) adjusting the digital control signal so as to synchronize said first comparison voltage and said reference voltage, thereby achieving said adjustment of the output sensitivity.

16. The method as defined in claim 15, wherein after said step (c) further includes a substep (c1): normalizing said input signal based on said reference voltage, thereby normalizing the bias DC into said reference voltage so as to normally adjusting the fluctuation bias voltage simultaneously with the bias DC.

17. The method as defined in claim 16, wherein after said substep (c1) further includes a substep (c2): outputting said triggering signal by said sensor system when the fluctuation bias voltage is located outside said standby voltage region.

18. The method as defined in claim 17, wherein after said substep (c2) further includes a substep (c3): outputting said triggering signal so as to trigger an operation system to perform a predetermined task when the fluctuation bias voltage is located outside said standby voltage region.

19. The method as defined in claim 17, wherein after said substep (c2) further includes a substep (c4): analyzing a triggering frequency of said triggering signal.

20. The method as defined in claim 19, wherein after said substep (c4) further includes a substep (c5): determining whether said triggering frequency is located within a predetermined frequency range and conducting said step (d) if said triggering frequency is located outside of said predetermined frequency range.

* * * * *